United States Patent [19]

Kohmoto et al.

[11] Patent Number: 5,134,432

[45] Date of Patent: Jul. 28, 1992

[54] CAMERA WITH MID-EXPOSURE ZOOMING FUNCTION

[75] Inventors: Shinsuke Kohmoto; Tomoaki Itabashi; Isao Soshi; Tatsuhide Takebayashi, all of Tokyo, Japan

[73] Assignee: Asahi Kogaku Kogyo Kabushiki Kaisha, Tokyo, Japan

[21] Appl. No.: 655,104

[22] Filed: Feb. 14, 1991

[30] Foreign Application Priority Data

| Feb. 14, 1990 | [JP] | Japan | 2-33003 |
| Feb. 14, 1990 | [JP] | Japan | 2-33004 |
| Feb. 14, 1990 | [JP] | Japan | 2-33005 |
| Feb. 14, 1990 | [JP] | Japan | 2-33006 |
| Feb. 14, 1990 | [JP] | Japan | 2-33007 |
| Feb. 14, 1990 | [JP] | Japan | 2-33015 |
| Feb. 24, 1990 | [JP] | Japan | 2-33008 |

[51] Int. Cl.$^5$ ............... B03B 7/00; B03B 1/18
[52] U.S. Cl. .................. 354/412; 354/195.12
[58] Field of Search ........... 354/195.1, 195.12, 410, 354/412

[56] References Cited

U.S. PATENT DOCUMENTS

| 3,504,965 | 4/1970 | Lustig | 352/171 |
| 4,206,982 | 6/1980 | Osanai | 352/140 |
| 4,731,629 | 3/1988 | Aoshima et al. | 354/410 |

FOREIGN PATENT DOCUMENTS 61-228426 10/1986 Japan.

Primary Examiner—L. T. Hix
Assistant Examiner—David M. Gray
Attorney, Agent, or Firm—Sandler, Greenblum & Bernstein

[57] ABSTRACT

A camera having a mid-exposure zooming function, including a zoom motor driving a zoom lens, a trigger switch initiating mid-exposure zooming, and a mid-exposure zooming execution mechanism for initiating the driving of the zoom motor based on the operation of the trigger switch for initiating exposure.

46 Claims, 27 Drawing Sheets

CAMERA WITH MID-EXPOSURE ZOOMING FUNCTION

BACKGROUND OF THE INVENTION

1. Field of the Invention

The present invention relates to a camera with a powered zoom lens, and more particularly to a camera with mid-exposure zooming function, i.e., a camera having a zooming function which is operable during exposures.

2. Description of Related Art

Mid-exposure zooming is a photographing technique whereby focal length is intentionally changed during the period of an exposure so as to provide the particular effect of representing a sense of movement by utilizing the mechanism of variable focal length which is characteristic of the zoom lens. In general, the pictures taken by the mid-exposure zooming have a flow of an image due to the focal length change during exposure.

This mid-exposure zooming operation is carried out during the time of exposure, and so its results depend on the shutter-releasing timing, the preset shutter speed, the manual adjustment of the zooming speed, and so on. Thus, this operation relies on the "skilled-technique" (or the "intuition") of the user.

In a camera having a powered zoom lens, i.e., a zoom lens using a driving power for the zooming operation, such a mid-exposure zooming operation may be carried out with relative ease, but the camera is not designed to perform the exposure and the zooming operations in coordination. Therefore, skilled technique is needed on the part of the user for releasing the shutter while simultaneously manipulating the powered zoom switch so it turns ON. Consequently, using this type of camera is only slightly more convenient than using the type of camera having a manual mode zooming function.

SUMMARY OF THE INVENTION

It is therefore an object of the present invention to provide a camera adapted to carry out mid-exposure zooming automatically and reliably through a simple manipulation.

The present invention comprises a zoom motor for driving the zoom lens, a trigger switch for initiating the mid-exposure zooming operation, and mechanism for effecting the drive of the zoom motor to start the exposure operation in accordance with the operation of this trigger switch.

This arrangement permits the user to carry out the mid-exposure zooming operation automatically and with reliable results, as it is not necessary to rely on the user's skill technique or expertise.

The mechanism for executing the mid-exposure zooming operation consists of the zooming starting mechanism and the exposure starting mechanism.

Furthermore, according to one aspect of the present invention, a mechanism is provided for detecting sufficient (i.e., proper) condition for enabling the exposure starting mechanism to start exposure synchronously with the operation of the zooming starting mechanism. This arrangement permits the user to carry out the mid-exposure zooming operation manually with ease, and also allows the user to initiate the exposure operation once a zooming movement has become stable, for maximum effect. The mid-exposure zooming execution mechanism comprises a zooming starting device, an exposure starting device, a counting device for counting down the exposure time after the actuation of the zooming starting device, a device for reading a shutter speed and a device for stopping the rotation of the zoom motor when the count-down value in the counting device has reached a predetermined ratio in a total exposure time. The invention thus permits the user to carry out the mid-exposure zooming operation manually with ease and to stop the zooming operation automatically prior to completion of the exposure.

Preferably, the mechanism for executing the mid-exposure zooming operation comprises a detection means for focal length, a focal length memory means for storing focal length data both at the beginning and at the end of the zooming operation, respectively, and a device for reading the shutter. A motor speed control is provided for controlling the driving speed of the zoom motor, thereby permitting the user to carry out the mid-exposure zooming operation manually with ease, and to set the zooming speed appropriately according to the result of the comparison between the focal length and the shutter speed so that an image with a smooth and unvarying density may be formed.

In another aspect of the present invention, the mechanism for executing the mid-exposure zooming operation further comprises a focal length detection mechanism for detecting variations in the magnitude of the focal length, and a comparison mechanism for comparing focal length variations which are detected with a variation ratio of the focal length. A motor speed control mechanism for controlling the rotation speed of the zoom motor according to the comparison results issued from the comparison mechanism is provided, thereby permitting the user to carry out the mid-exposure zooming operation with ease to keep variation in focal length constant, while performing a zooming operation so that an image with a smooth density may be obtained.

In still another aspect of the present invention, the mechanism for executing the mid-exposure zooming operation further comprises a focal length memory for storing focal length data, and a motor control mechanism for stopping the zoom motor upon its reaching a particular focal length, in order to stop the zooming operation as stored in the memory and thereby permit the user to carry out the mid-exposure zooming operation manually with ease and to terminate the zooming operation at any focal length which has been set to end the zooming operation after use has confirmed the focal length by, for example, looking through the finder. This also permits the user to imagine the photograph to be finally formed before it has actually been taken.

Furthermore, in accordance with one aspect of the present invention, the mechanism for executing the mid-exposure zooming operation further comprises a shutter speed reading-in device for reading in the shutter speed, and a zooming starting limit device for actuating the mid-exposure zooming operation only when the shutter speed is slower than a reference shutter speed which has been preset beforehand, thereby permitting the user to carry out the mid-exposure zooming operation manually with ease and limit the mid-exposure zooming operation under the slit exposure. This also serves to avoid the problem that the resultant image may contain irregular exposures.

In addition, if the camera of the invention comprises the mid-exposure zooming mode wherein the zooming operation is actuated during exposure and a control mechanism for varying the zooming speed in response to the variation in the F value of the diaphragm caused by the zooming operation, then an uneven exposure in the resultant image will be eliminated in cases where the mid-exposure zooming operation is carried out by means of the zoom lens which varies its F value due to zooming.

The present disclosure relates to subject matter contained in Japanese Patent Application Nos. 0233003, 02-33004, 02-33005, 02-33006, 02-33007, 02-33008, 02-330015 (all filed on Feb. 14, 1990) which are expressly incorporated herein by reference in their entirety.

BRIEF DESCRIPTION OF THE DRAWINGS

The present invention will be described hereinbelow, with reference to one embodiment shown in the accompanying drawings, in which:

FIG. 12 is a flow chart showing a second embodiment of the invention;

FIG. 13 is a block diagram showing a control circuit for a camera in a third embodiment of the invention;

FIG. 14 is a flow chart showing how the third embodiment operates;

DETAILED DESCRIPTION

Figure 2:
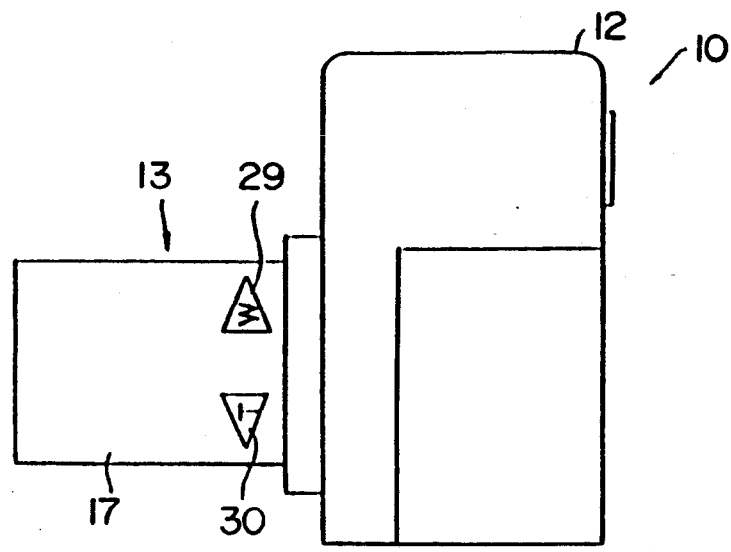
FIG. 2 is a lateral view showing the general appearance of the camera.
Figure 3:
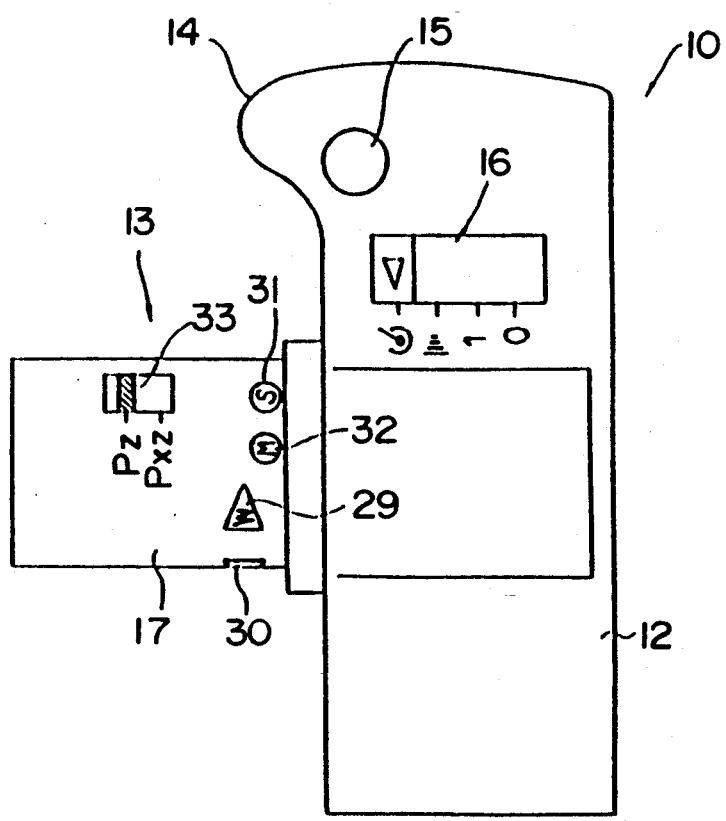
FIG. 3 is plane view of FIG. 2.

FIGS. 2 and 3 show a camera 10 in which the present invention is embodied.

The camera (single lens reflex camera) comprises an automatic focusing device and an automatic exposure device in addition to a power zoom lens.

The body 12 of the camera 10 is provided at its front end with a zoom lens 13 and a grip portion 14. Provided on the upper surface of the camera body are a shutter release switch (button) 15, and a mode selection switch (button) 16 for switching the camera photographing mode. The shutter release switch 15 is connected to a light measuring switch SWS so that when the release switch 15 is depressed half-way (to a first step), the light measuring switch SWS is turned ON.

Figure 4:
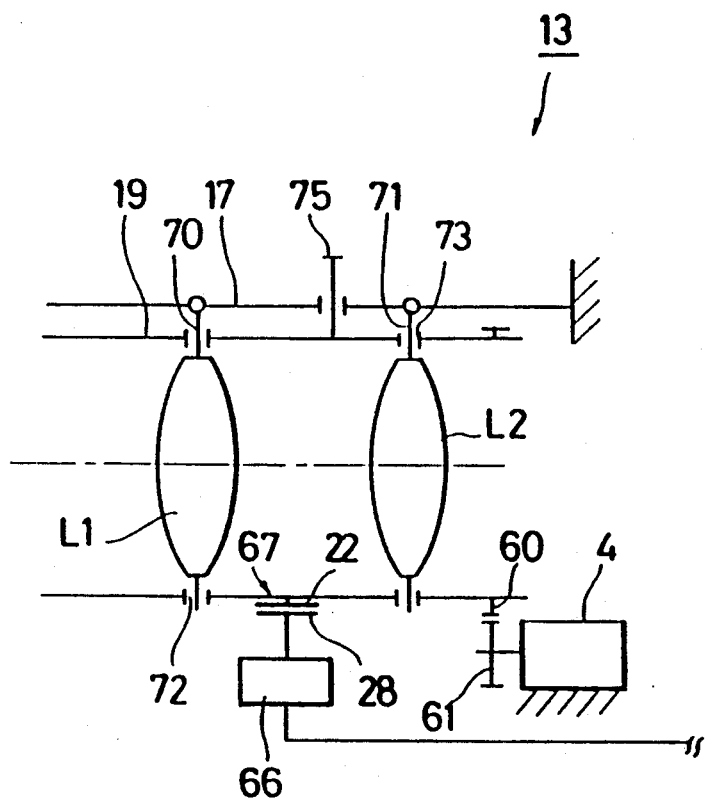
FIG. 4 is a schematic view showing the actuating mechanism of the powered zoom lens.

As shown in FIG. 4, the zoom lens 13 comprises two sets of lens groups L1 and L2. The first and the second lens groups L1 and L2 have a plurality of roller pins 70 and 71 secured to and projected radially from the outer circumference thereof, these roller pins 70 and 71 engage in cam grooves 72 and 73 formed in a cam ring 19. At least the roller pin of respective roller pins 70 and 71 engages a linear guide groove formed in a stationary lens barrel 17.

Figure 7:
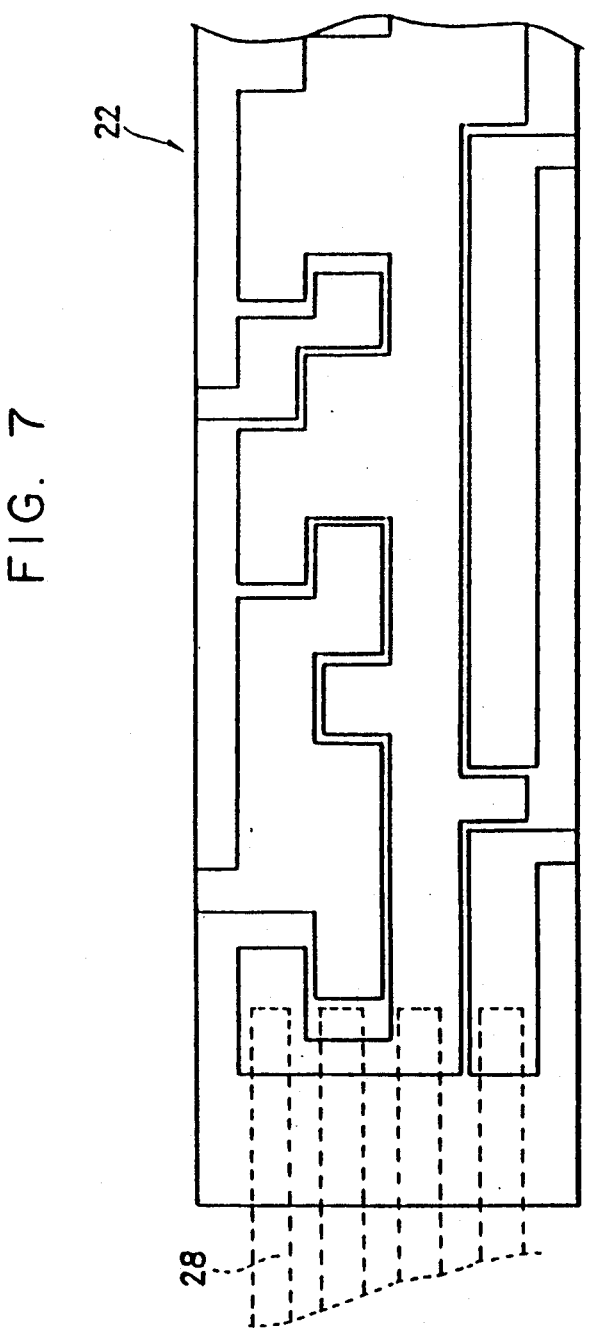
FIG. 7 is an enlarged view of the code plate into which zooming positions are read.

An annular gear 60 is fixed in position around the outer circumferential surface of the cam ring 19, and the pinion 61 of the zoom motor 4 engages the gear 60. Thus, the cam ring 19 is driven to rotate by means of the zoom motor 4 to move the first and the second lens groups L1 and L2 in the optical axis direction thereof, thereby providing a zooming effect. A decoder 67 is provided on the outer circumferential surface of the cam ring 19 for detecting the position of the cam ring 19 and determining the focal length f. This decoder 67 consists of a code plate 22 (FIG. 7) and a code plate brush 28.

Signals which are read out by the decoder 67 are outputted to the lens CPU 66. The lens CPU 66 determines a focal length f and its corresponding full-open F value (minimum F number) from the output of the decoder 67, and then these data are outputted to the control section 1 of the camera body 12. There is also shown in FIG. 4 a zoom-manipulating ring 75 for use in a manual zooming operation.

The outer stationary lens barrel 17 comprises a wide-angle switch (button) 29, a telescoping switch (button) 30, a start switch (button) (trigger switch) 31, a memory switch (button) 32, and a Pz (power zoom) mode selection switch (button) 33 (FIGS. 2 and 3).

Figure 5:
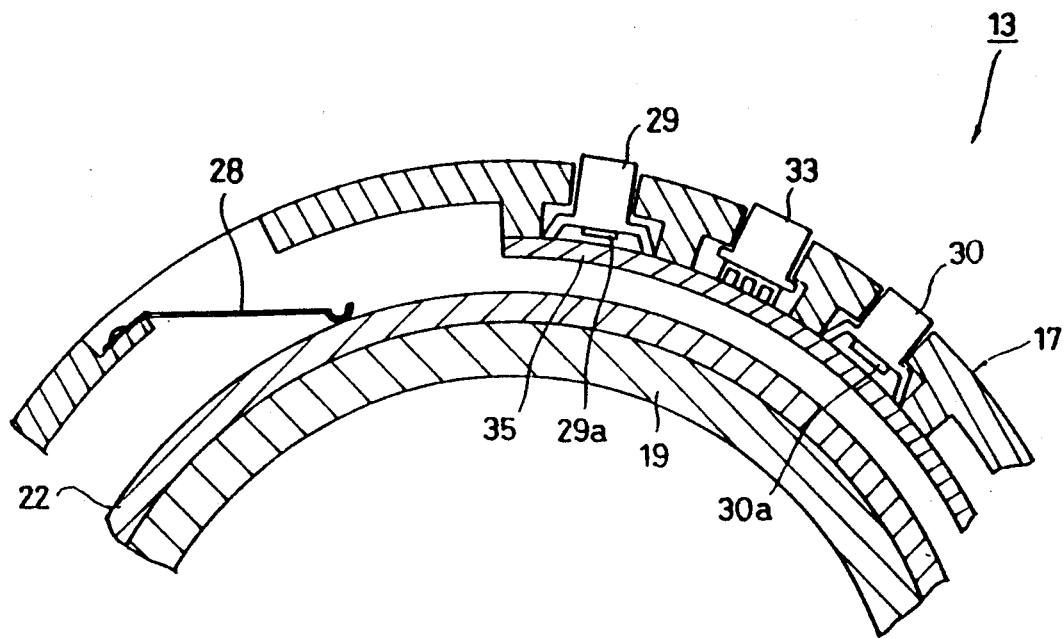
FIG. 5 is front cross-sectional view showing an essential portion of the powered zoom lens on a partially enlarged scale.
Figure 6:
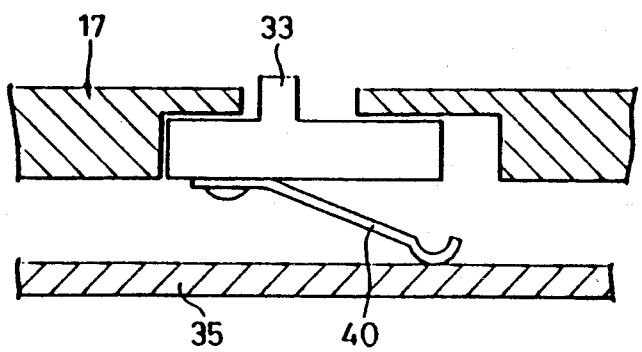
FIG. 6 is an enlarged cross-sectional view showing the construction of the Pz mode switch.
Figure 8:
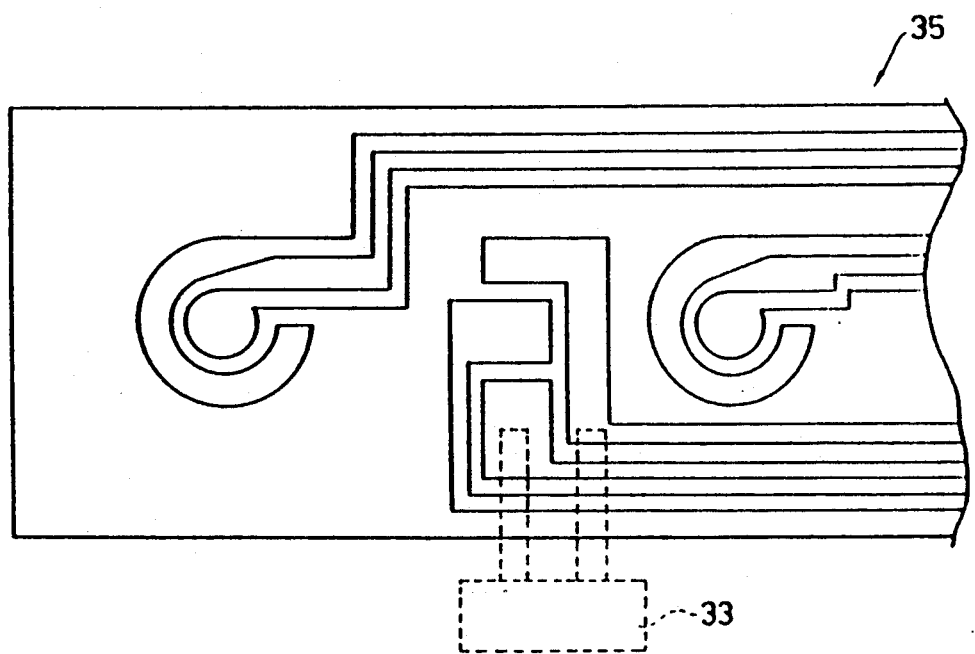
FIG. 8 is an enlarged view showing the control input substrate.
Figure 9:
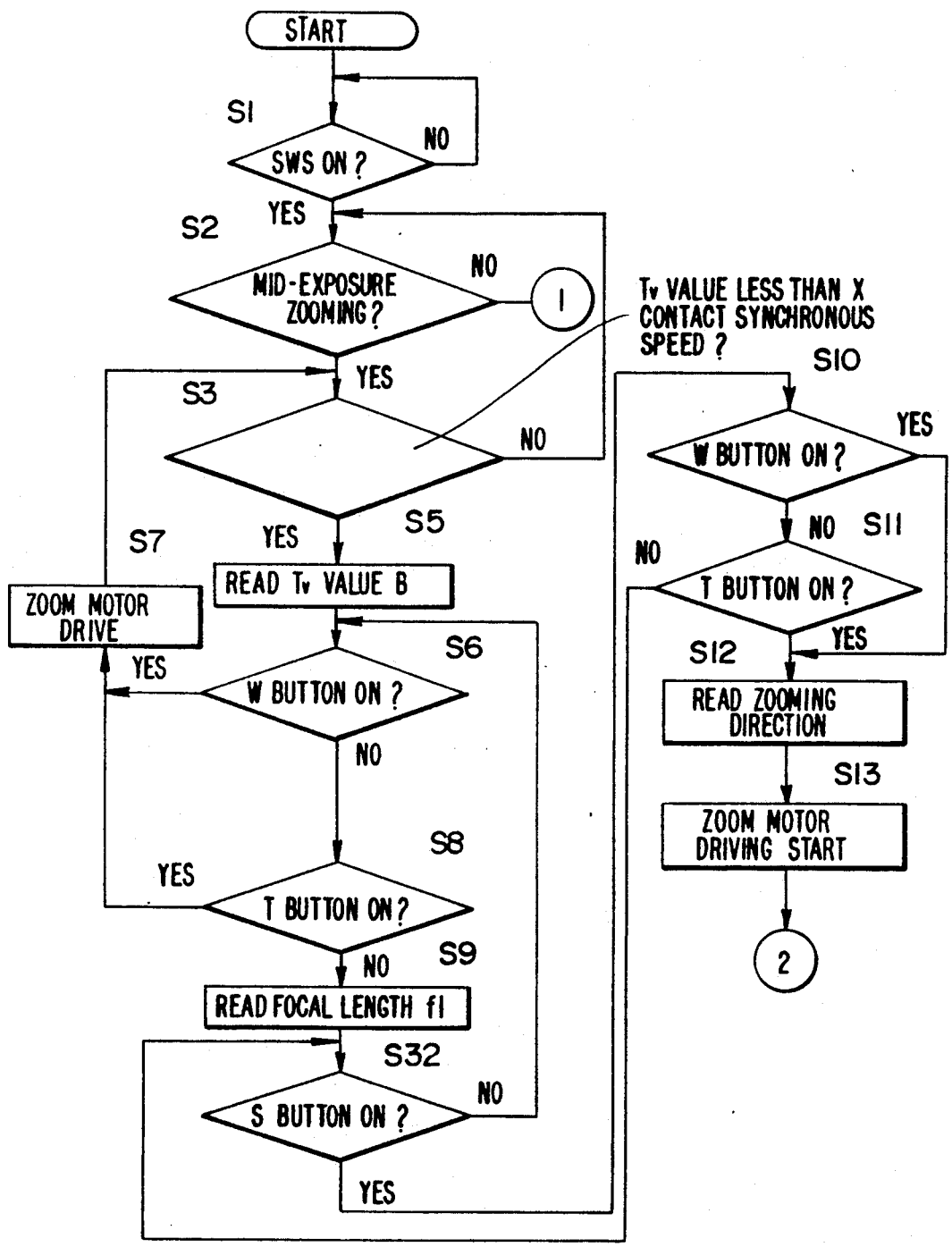
FIGS. 9-14 are flow charts showing how the first embodiment operates.

The wide-angle switch 29 and the telescoping switch 30 in FIG. 5 have springs which make them flexible and comprise conductive contact strips 29a and 30a at the position where they lie opposite to the control input substrate (FIG. 8). Thus, when the wide-angle switch 29 is depressed, the conductive contact strips 29a come into electrical contact with the control input substrate 35 to turn it ON, whereas the conductive contact strip 30a comes into electrical contact with the control input substrate 35 when the telescoping switch 30 is depressed.

The Pz mode selection switch 33 is adapted to switch a photographing operation between the Pz (power zoom) mode and the Exz (exposure zoom) mode, and the switch 33 can be actuated by moving the Pz mode switch 33 in the forward and rearward directions to cause the code plate brush 40 to come into contact with the control substrate 35 for selecting an operational mode.

Figure 1:
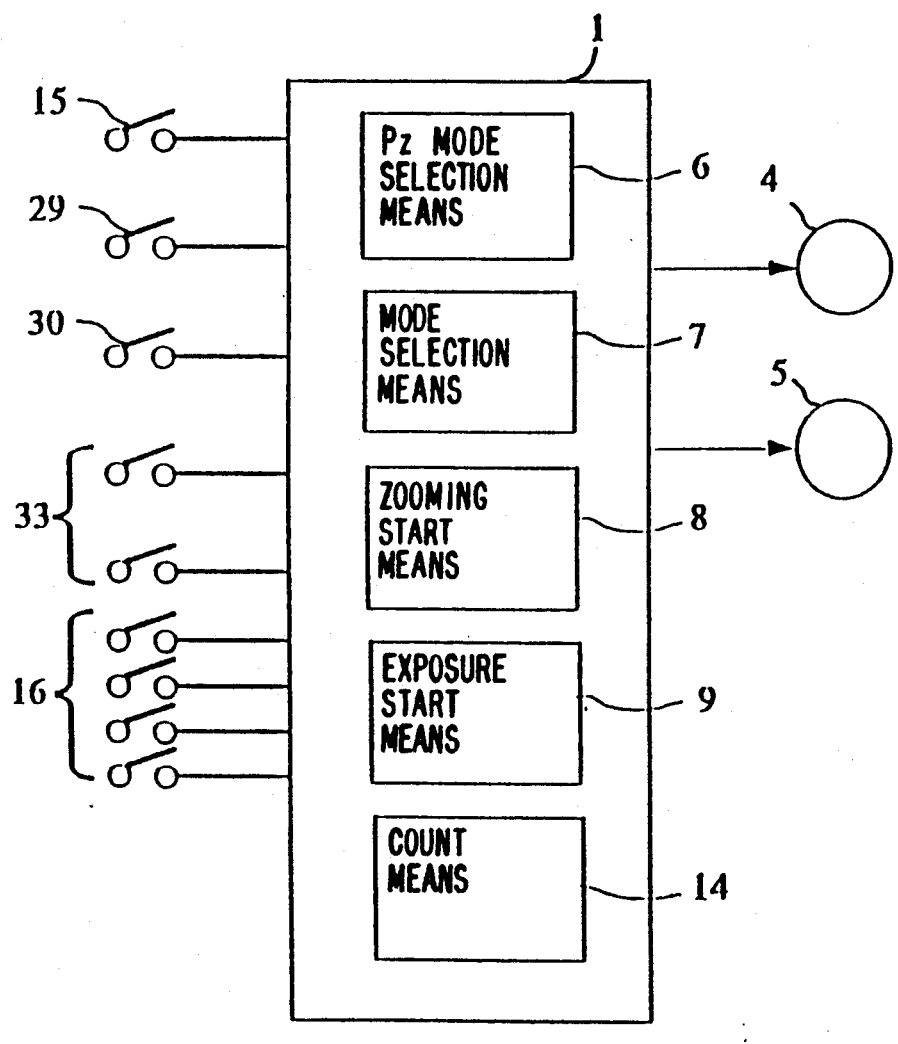
FIG. 1 is a block diagram showing a control circuit of the camera in accordance with one embodiment of the invention.

Now, the control circuit of the camera 10 in the first embodiment of the invention will be described with reference to FIG. 1.

Connected with the input of the control section 1 are the release switch 15, the wide-angle switch 29, the telescoping switch 30, the Pz mode selection switch 33 and the mode selection switch 16. Connected with the output of the control section 1 is a solenoid 5 which actuates the motor 4 and the shutter The control section 1 comprises Pz mode selection means 6, mode selection means 7, zooming starting means 8, exposure starting means 9 and count means 14.

The mode selection means 6 is adapted to switch the operating mode between the Pz mode and the Exz mode in response to an input signal from the Pz mode selection switch 33.

The mode selection means 7 is adapted to switch the operating mode into the self-timer mode, etc., in response to the input signal from the mode switch 16.

The zooming starting means 8 is adapted to initiate a zooming operation by outputting a drive signal to the motor 4 in response, to an input signal from either the wide-angle switch 29 or the telescoping switch 30.

The count means 14 initiate its count-down action in synchronization with the starting of the zooming operation by the zooming starting means 8.

The exposure starting means 9 initiates an exposure operation by outputting a signal to a solenoid at a passage of preset or predetermined time after the start-up of the count-down operation by the count means 14. The above-mentioned preset or predetermined time is the time during which the zooming speed becomes constant. The predetermined time could be set at 1/10 of the whole exposure time.

FIGS. 9–12 show the operation of the camera having the construction as above-described.

In step S1, it is determined whether the light measuring switch SWS is ON or not. If the light measuring switch is not turned ON, the step S1 is repeated. The process advances to step S2 when the switch is turned ON.

In step S2, it is judged whether the mid-exposure zooming operation is about to be taken, and the process advances to step S3 if the mid-exposure zooming is about to be taken, or the process advances to step S4 if the mid-exposure zooming operation is not to be taken.

During this period, a photographing composition is determined, and the shutter speed is preset by manipulation of the shutter dial.

In step S3, it is judged whether the Tv value (shutter speed) is slower or faster than the synchronous speed of the X contact (synchronous speed of the strobe), and the process is repeated if the shutter speed is faster than the synchronous speed of the X contact, or the process is advanced further to step S5 to read in the Tv value B if the speed is slower than the synchronous speed of the X contact.

At this point, the user may move the zoom lens 13 to shift its focal length in a direction which is opposed to the direction of intended zooming during the mid-exposure mode. Then, the Pz mode selection switch 33 can be manipulated to set it to the Exz mode.

In step S6, it is judged whether the wide-angle switch 29 is ON or not. The process is advanced to step S7, if the wide-angle switch 29 is turned ON for driving the zoom motor 4 to by-pass the process into step S3. The process is advanced to step S8 if the wide-angle switch 29 is not turned ON.

In step S8, it is judged whether the telescoping switch 30 is ON or not, and the process is advanced to step S7 if the switch 30 is turned ON. The process advances to step S9 if the switch is not turned ON.

In step S9, a focal length f1 is read in, and it is judged whether the start switch 31 is turned ON in step S32. As a result, the process advances to step S10 if the switch is turned ON, or the process is by-passed to step S6 if the switch 31 is not turned ON.

In step S10, it is judged whether the wide-angle switch 29 is ON or not, and the process jumps to step S12 if the switch 29 is turned ON, or the process advances to step S11 if the switch is not turned ON.

In step S11, it is judged whether the telescoping switch 30 is ON or not, and the process advances to step S12 if the switch is turned ON, or the process returns back to step S32 if the switch is not turned ON.

In step S12, the zooming direction of the lens is read in, and then in step S13 the zoom motor is actuated to advance the process to step S14.

In step S14, the counting means 14 initiate its count-down operation of the Td value (value counted down from the starting of the zooming operation) to advance the process to step S15.

In step S15, it is judged whether or not the Td value equals the value A (a preset value used to initiate the exposure operation at a selected count-down value after the zooming starting), and the process advances to step S16 if a preset value is reached, or returns back to step S14 if the preset value is not reached.

In step S16, a release signal is emitted to exposure starting means 9 and it is judged whether a switch 2CSW (which is adapted to be turned ON once the second blind of the focal plane shutter has finished its movement) is turned ON.

As a result, the process advances to step S18 if the switch is turned ON, in order to step the zoom motor 4, then the process goes to Return(in flow-chart). If the switch is not turned ON, step S17 is repeated.

In step S4, the process advances to step 20, if the wide-angle switch 29 is turned ON to drive the zoom motor 4, or the process advances to step S21 if the switch 29 is not turned ON.

In step S21, it is judged whether the telescoping switch 30 is turned ON, and the process advances to step S22 if the switch is not turned ON or to step S20 if the switch 30 is turned ON.

In step S22, it is judged whether or not the release switch is ON, and the process returns back to step S4 if the switch is not turned ON. If the switch is turned ON, the process advances to step S23 to actuate the exposure starting means 9 to emit a release signal, thereby advancing the process to step S24.

In step S24, it is judged whether or not the switch 2CSW is ON; the process is repeated if the switch is not turned ON, and the process goes to Return if the switch is turned ON.

Figure 11:
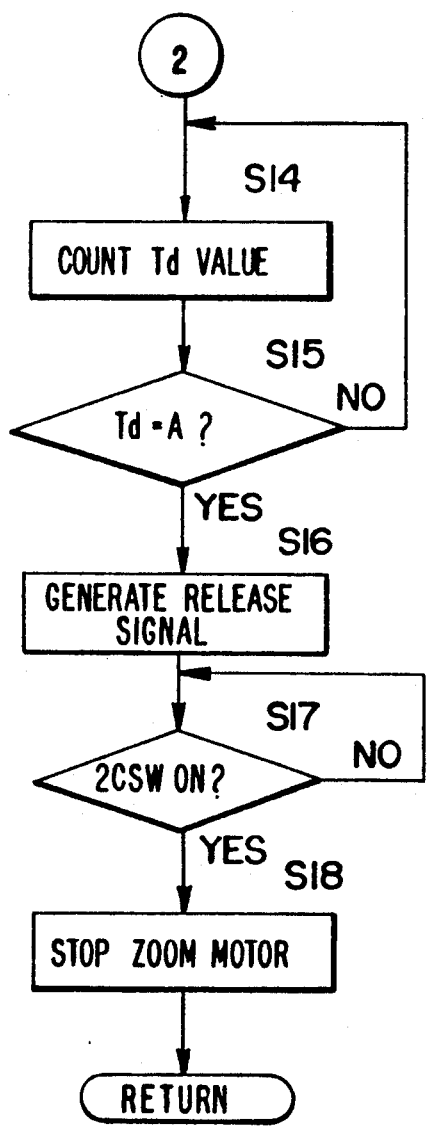
Figure 12:
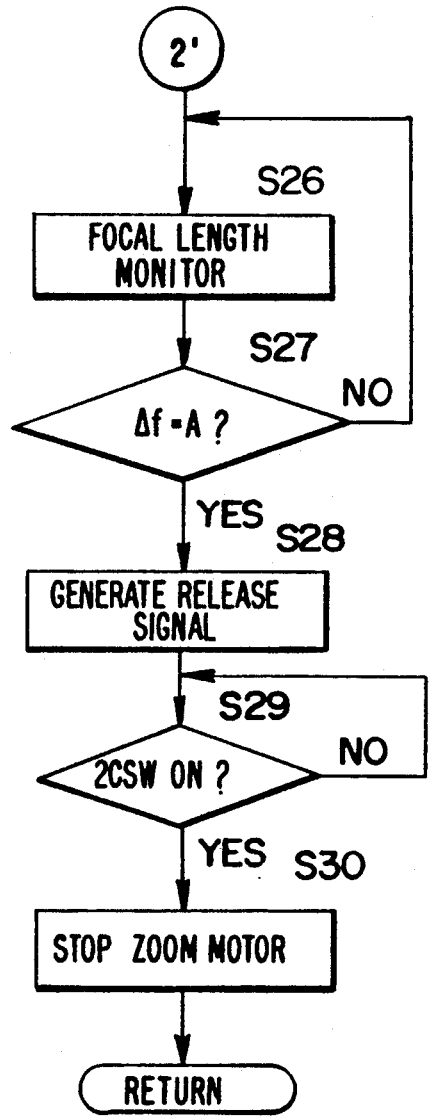

Next, there is a second embodiment of the present invention wherein a process occurring just after step S14 in FIG. 11 is modified; this will be described with reference to FIG. 12. In the first embodiment, after the zooming operation is initiated by turning ON the start switch 31, the Td value is counted down to determine the starting timing of the exposure. The exposure operation is initiated in this second embodiment by detecting a time when the magnitude Δf in the focal length variation reaches a preset value.

In step S26, focal length is monitored after the actuation of the zoom motor 4 (step S13).

In step S27, it is judged whether Δf=A and the process returns back to step S26 if the relationship Δf=A is not present. The process advances to step S28 if Δf=A is present to actuate the exposure starting means 9 to generate the release signals. It is further judged whether the switch 2CSW is turned ON or S29). If the switch is not turned ON, the process repeat at the step S29, and if the switch is turned ON, the process degenerizes the zoom motor 4 (step S30) for Return.

Thus, the mid-exposure zooming may be carried out automatically simply by turning ON the start switch 31 without relying on the skilled-technique of the user in accordance with the first and the second embodiments. Furthermore, an exposure operation can be initiated in a predetermined period of time after the starting of the zooming operation, and consequently the exposure operation may be initiated after the zooming operation becomes stable, thereby eliminating the inconvenience of things such as camera shakes, and unstable zooming speed. Thus, he disadvantage of having the image of the object photographed in an excessively clear position before the zooming operation begins is eliminated.

Figure 13:
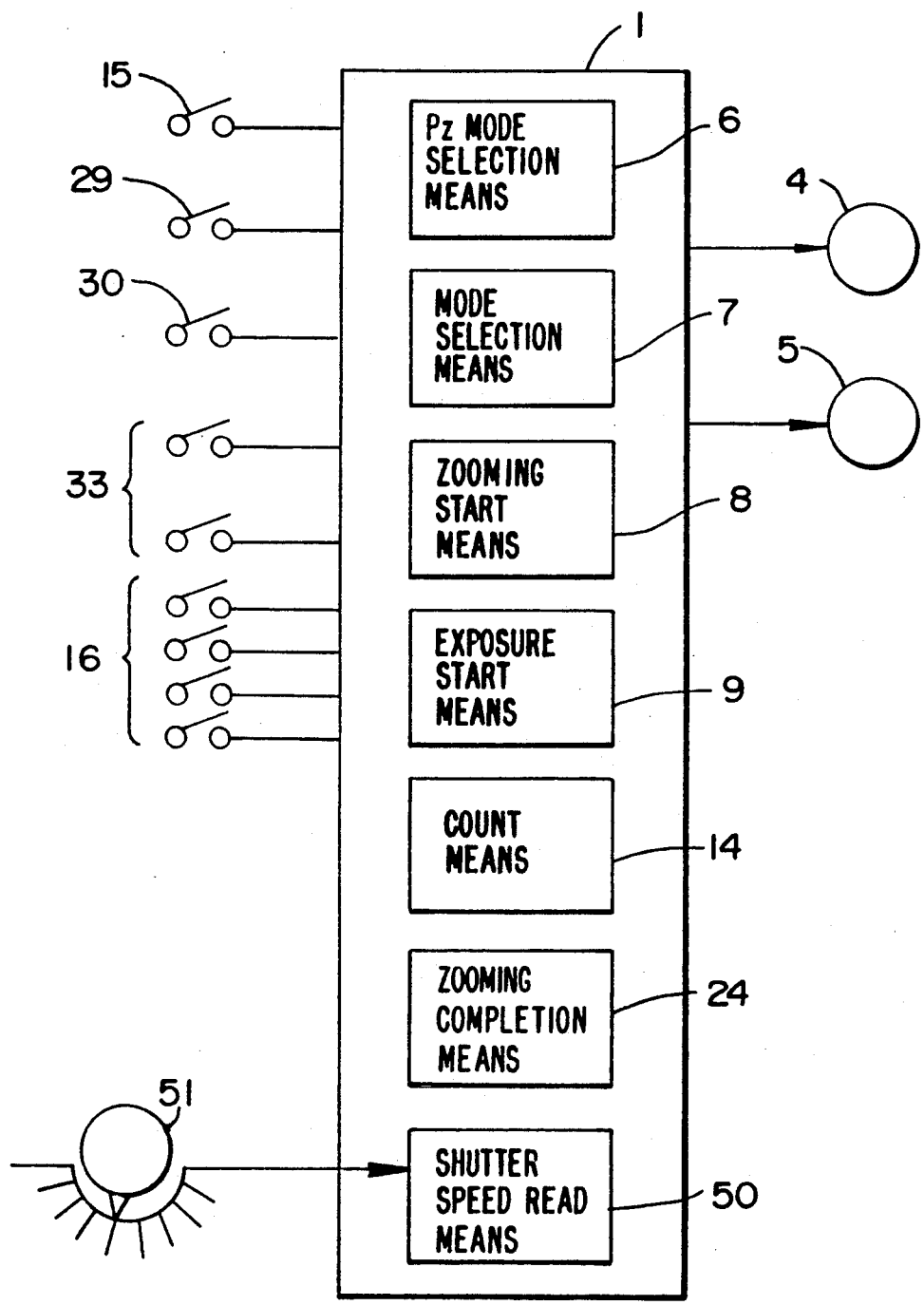

The control circuit of the camera 10 will be described hereinbelow in accordance with the third embodiment of the invention, with reference to FIG. 13 Components which are similar to those in the first and the second embodiments will be indicated with similar symbols in this embodiment.

The control section 1 comprises shutter speed read-in means 50 and zooming-termination means 24 in addition to various means as described in the second and the third embodiments, having a shutter dial 51 connected therewith.

The shutter read-in means 50 is adapted to read in the shutter speed as established by the shutter dial. The zooming termination means 24 acts to stop the zoom motor 4 from driving when the count-down value by the count means 14 reaches a preset level relative to the shutter speed as read in by the shutter speed read-in means 50.

Figure 14:
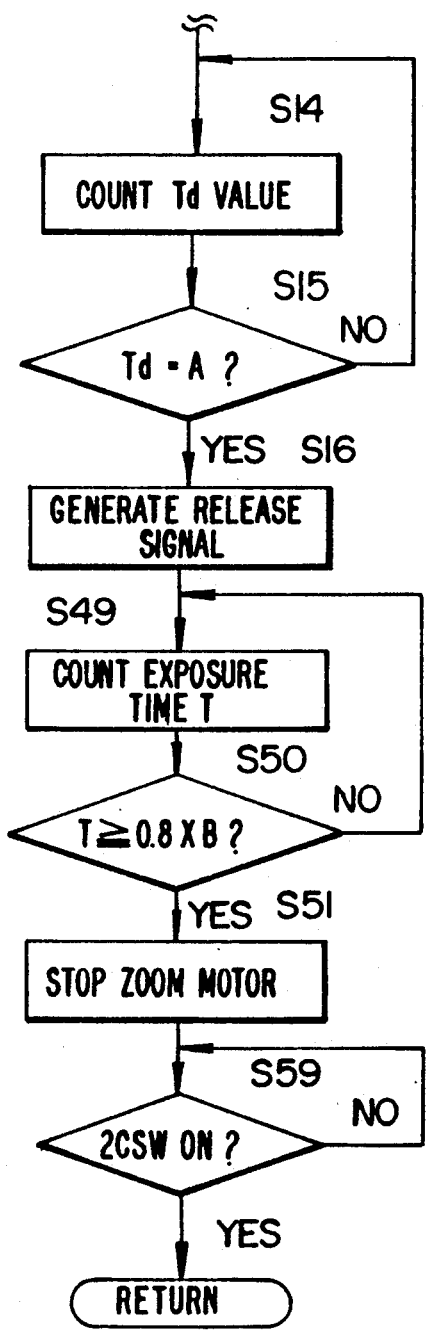

The third embodiment is similar to the first embodiment in terms of many aspects of operation, but they are different in the process occurring after step S16 in FIG. 11. This process will be indicated in FIG. 14.

In step S14, the counting means 14 initiates the count-down of the Td value.

In step S15, it is judged whether the Td value equals the value A; the process is repeated if they are not equal, and the process advances to step S16 if they are equal to each other.

In step S16, the release signal is generated by means of the exposure starting means 9 to advance the process to step S49.

In the step S49, the counting means 14 counts down the exposure time after the exposure starting means 9 has initiated its exposure operation.

In step S50, the shutter speed read-in means 50 compares a value which has been calculated as 80% of the shutter speed as read in by the shutter speed read-in means 50 and the exposure time T. As a result, the process is repeated in step S49 if the exposure time T is shorter than a calculated value. The process advances to step S51 if the exposure time T is longer than or equal to a calculated value.

In step S51, the zoom motor 4 is stopped in accordance with a signal from the zoom termination means 24 and the process advances to step S59 after the end of the zooming operation.

In step S59, it is judged whether the switch 2CSW is ON or not. As a result, the process repeats step S59 if the switch is not turned ON, and the process goes to Return if the switch is turned ON.

Thus, the mid-exposure zooming operation may be carried out automatically without relying on the skilled-technique on the part of the user. Moreover, the zooming operation may be terminated automatically before the exposure operation is completed. In this way, anyone can easily use the technique of photographing the object immediately after the completion of the zooming operation.

In the above embodiment, the shutter speed read-in means 50 compares the exposure time T with 80% of the shutter speed as read in by the shutter speed read-in means 50; such percentage of the calculated value relative to the shutter speed may be set arbitrarily.

Figure 15:
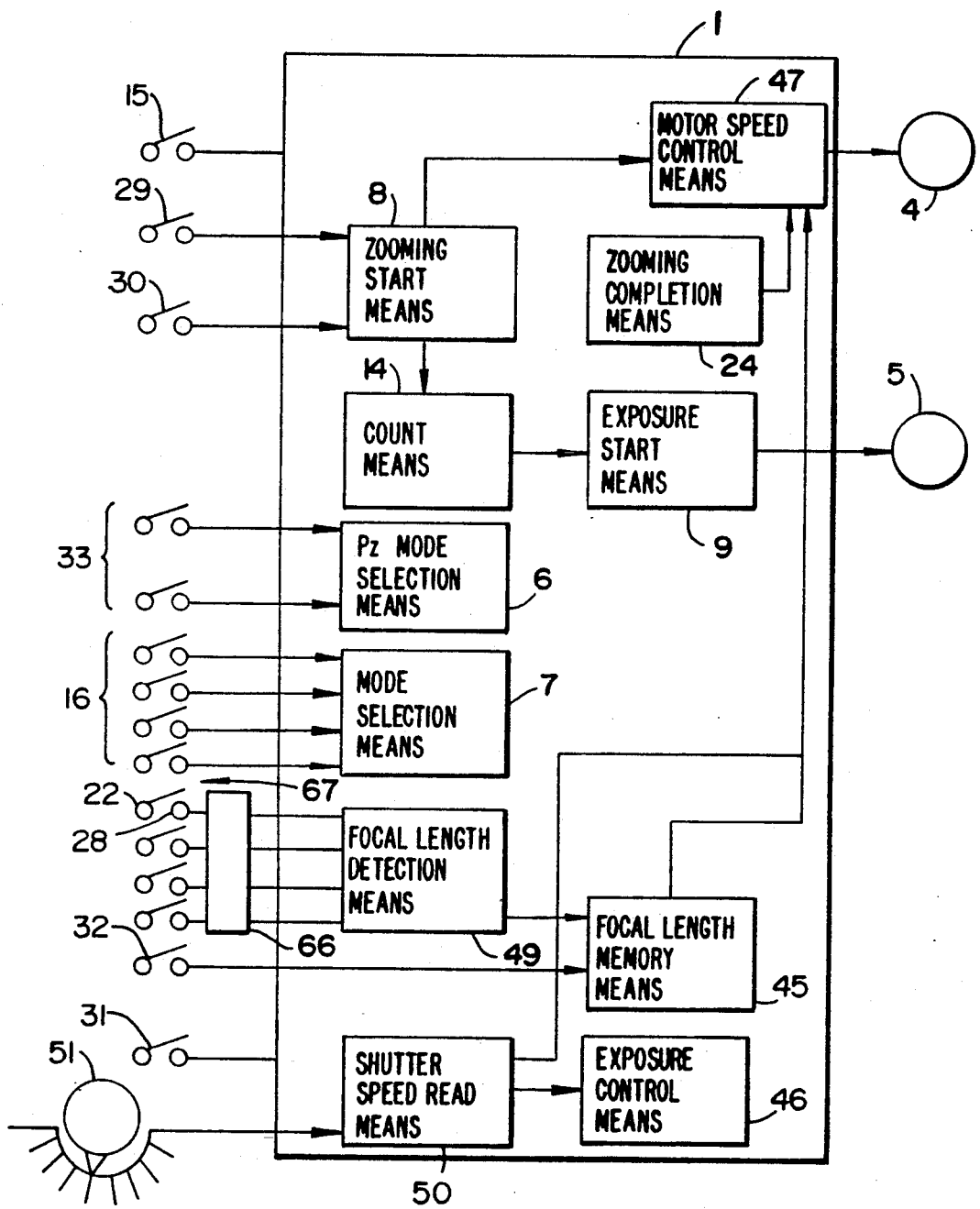
FIG. 15 is a block diagram showing a control circuit in a fourth embodiment of the invention.

The control circuit of the camera 10 will be described in accordance with the fourth embodiment of the invention, with reference to FIG. 15.

The portions which the fourth embodiment has in common with the third embodiment are indicated with similar symbols.

The control section 1 comprises a code plate brush 28 to be contacted by a code plate 22, a memory switch 32, a start switch 31, all components being connected therewith, at the input side, in addition to various switches and means as described in the third embodiment. The control section 1 further comprises focal length memory means 45, exposure control means 46, motor speed control means 47, and focal length detector means 49.

The focal length memory means 45 are adapted to memorize the focal length f1 when a zooming operation is terminated at a position where the zooming operation is to be ended, and the focal length f2 at the position where the zooming operation is initiated.

The exposure control means 46 control the exposure in response to signals from the shutter speed read-in means 50.

The motor speed control means 47 calculates a proper rotating speed of the zoo mot in response to the shutter speed Tv which is inputted into the shutter speed read-in means 50 to control the zoom motor 4 such that the zoom motor may be rotated at this speed as calculated.

The focal length detection means 49 receives signals as read in by the decoder 67 via a lens CPU 66 to thereby detect the focal length at the time of the zooming operation.

The zooming starting means 8 in the above embodiment actuates the zoom motor 4 to output drive signals via the motor speed control means 47 in responses to input signals from the wide-angle switch 29 or the telescoping switch 30, thereby initiating the zooming operation.

Figure 16:
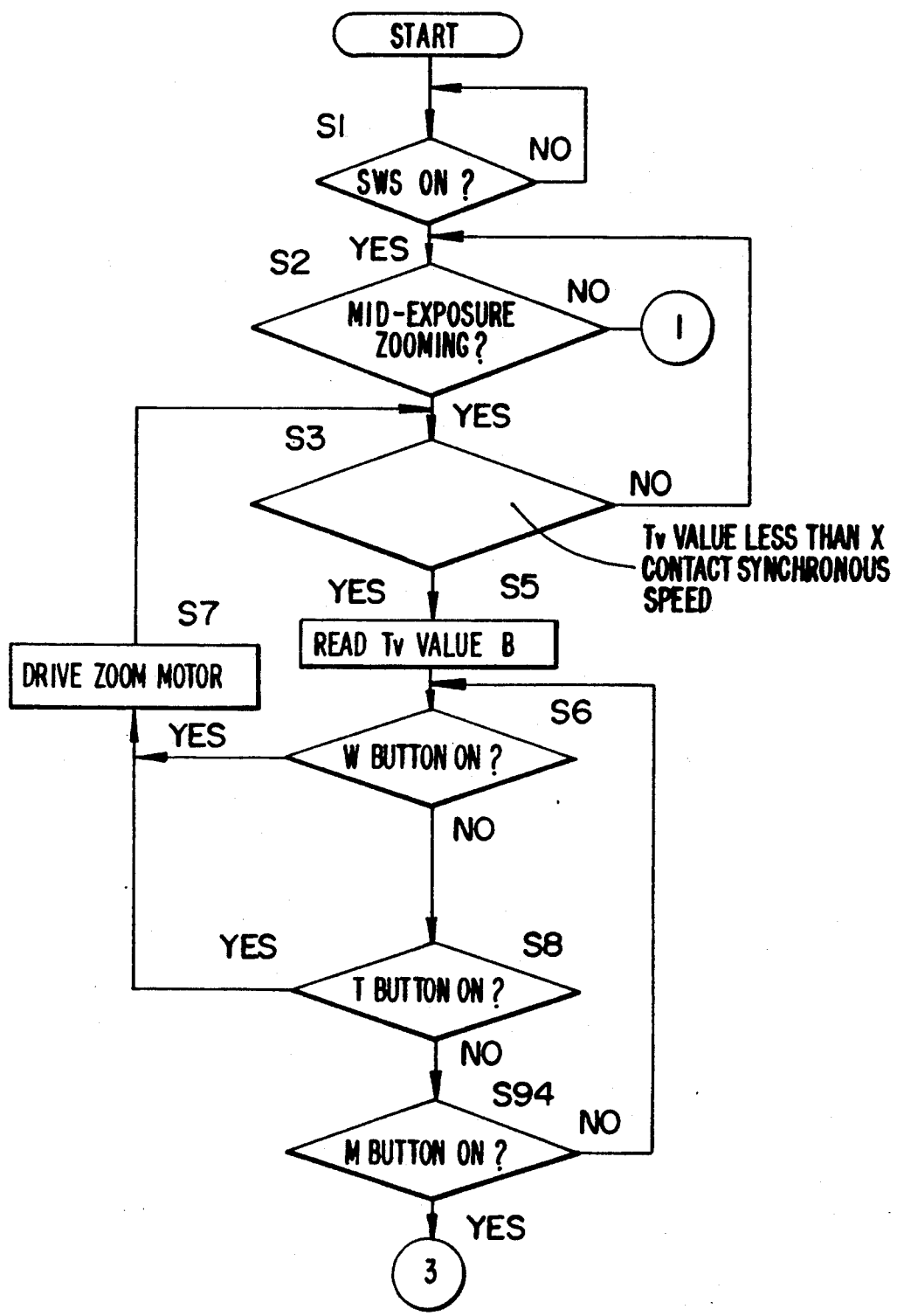
FIGS. 16-18 are flow charts showing how the fourth embodiment operates.
Figure 17:
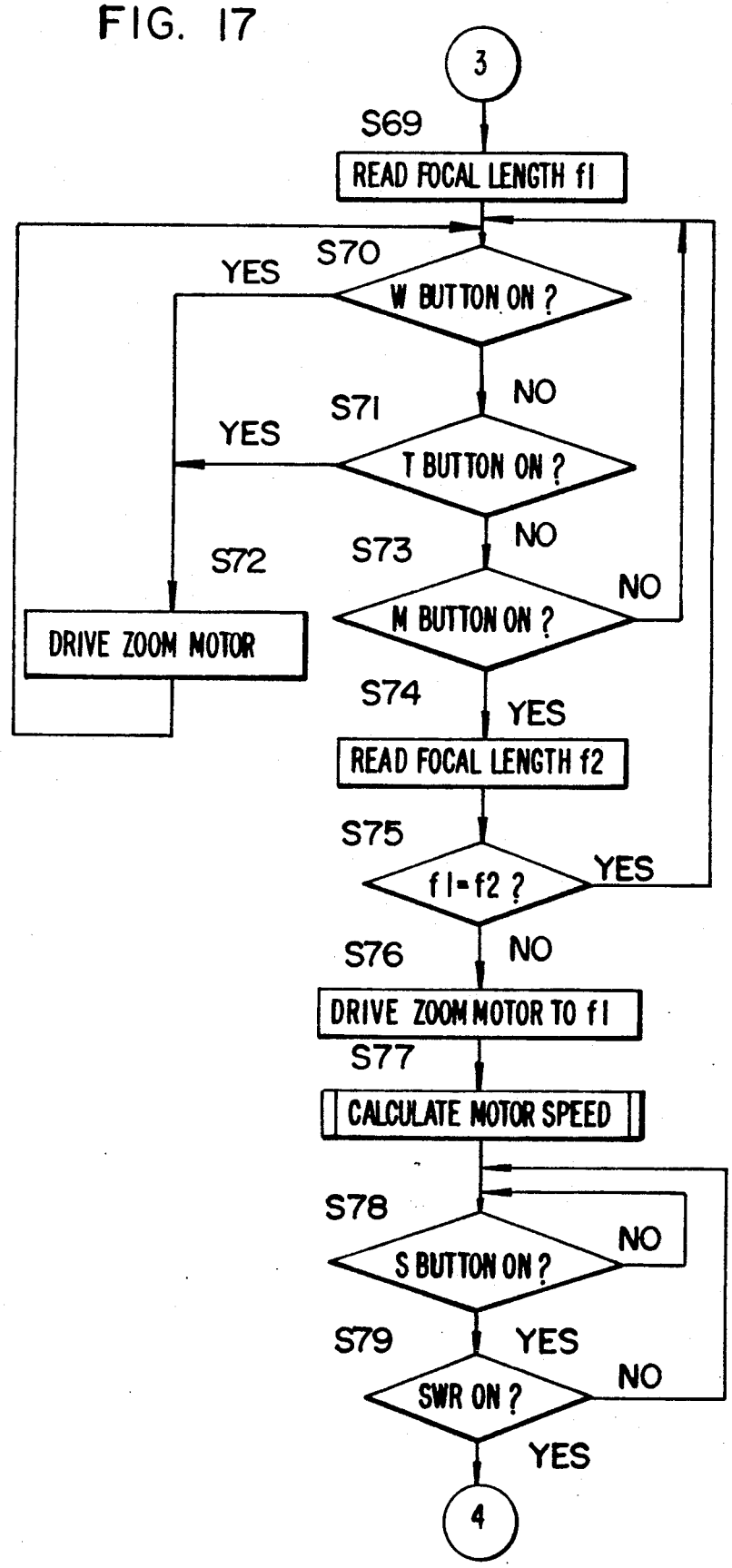
Figure 18:
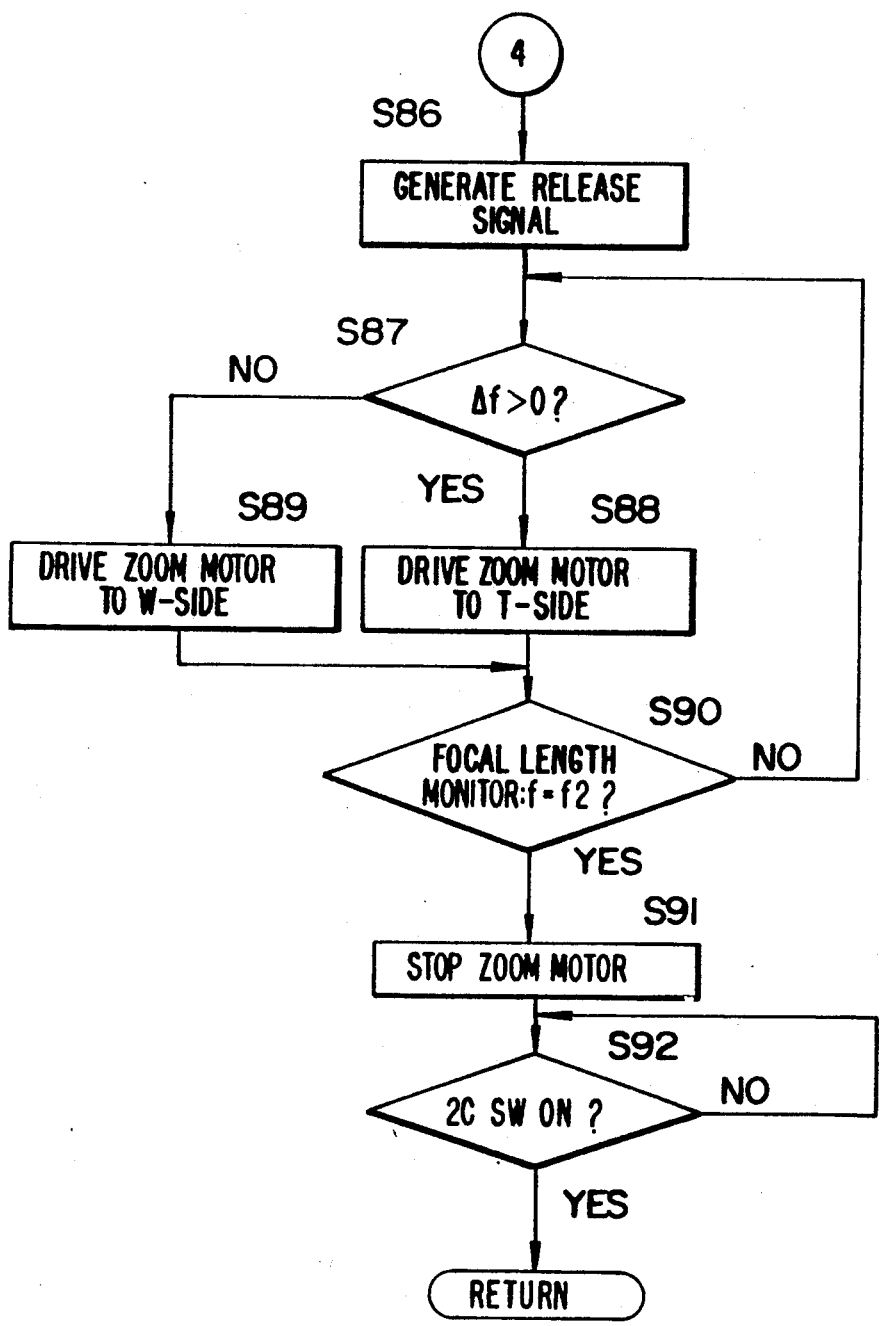

The present embodiment has many aspects which are identical with those in the first embodiment, except for a process to be followed after step S9. This difference is shown in FIGS. 16–18.

The controlling sequences which are the same as those in the first embodiment are executed up to step S8. If the telescoping switch 30 is not turned ON in step S8, the process advances to step S94.

The memory switch 32 is turned ON in order to memorize the focal length f1 when the zooming operation is terminated by the zooming operation and had its composition determined in step S7. Then, it is judged whether the memory switch 32 is ON or not in the step S94. The process is repeated if the memory switch 32 is not turned ON, and the process advances to step S69 if the memory switch 32 is turned ON.

In step S69, the focal length f1 for terminating its zooming operation is read in the focal length memory means 45 to judge whether the wide-angle switch 29 is turned ON (step S70).

The process advances to step S72 to drive the zoom motor 4 if the wide-angle switch 29 is turned ON, thereby initiating the zooming operation. The process advances to step S71 if the switch is not turned ON.

In step S71, it is judged whether the telescoping switch 30 is turned ON, and the process advances to step S72 to drive the zoom motor 4 if the switch is turned ON, thereby initiating the zooming operation. The process advances to step S73 if the switch is not turned ON. The memory switch 32 is turned ON so that the memory means 45 can memorize the focal length at the starting time when the composition of an image is determined by zooming operation. Then, in step S73, the memory switch 32 is judged whether it is ON or not. If it is not turned ON, the step S70 is repeated, or if it is turned ON, the process advances to step S74.

In step S74, the zooming lens 13 has its position read in the focal length memory means 45 as a focal length f2 at the starting of the zooming operation, and the Process advances to step S75.

In step S75, the zooming termination focal length f1, as read in step S69 and step S13 is compared with the zooming starting time focal length f2. As a result, the process is repeated if a relationship $$f1 = f2$$

exists, and the process advances to step S76 if a relationship $$f1 = f2$$

is not established.

In step S76, the zoom motor 4 is caused to rotate in order to drive the zooming lens 13 into a zooming termination focal length f1 to advance into step S77.

In step S77, the motor speed control means 47 calculates a proper rotating speed of the zoom motor 4. The proper rotation speed is calculated in the following way:

If it is assumed that the focal length at the termination of the zooming operation is set as f1 [mm], and the focal length at the starting of the zooming operation is f2 [mm], then the magnitude of variation Δf [mm] can be obtained from the following equation:

$$f = f2 - f1$$

If the shutter speed is t [sec] and the variation magnitude in the focal length per one revolution of the zoom motor 4 is Δf(1), then the zoom motor 4 is rotated with the amount of:

$$\Delta f / \Delta f(1)$$

Consequently, the rotating speed of the zoom motor 4 to complete this rotation is t [sec], and the following relationship exists:

$$(\Delta f/\Delta f(1))/t = (f2 - f1)/\Delta f(1) \cdot t$$
[number of rotation/sec].

Then, the mode switch 33 is operated to switch the operating mode into the Exz mode.

In step S78, it is judged whether the start switch 31 is ON or not, and the process repeats step S78 if the switch is not ON, and the process advances to step S79 if the switch is turned ON.

In step S79, it is determined whether the release switch is ON or not, and the process repeats step S78 if the release switch is not turned ON, and the exposure starting means 9 are actuated to generate the release signal if the switch is turned ON (step S86).

In step S87, it is judged whether $$\Delta f > 0,$$

and the process advances to step S89, if it is not.

If Δf>0 is not true, the process advances to step S89 in order to drive the zoom motor 4 to the wide angle side.

The process advances to step S88 if $$\Delta f > 0$$

to drive the zoom motor 4 to the telescoping side.

In step S90, the focal length is monitored to judge whether the focal length f2 for the starting of the zooming operation is equal to the focal length f selected as the target.

As a result, the Process is repeated from step S87 if $$f \neq f2,$$

and the process advances to step S91 if $$f = f2$$

to terminate the zoom motor 4 by means of the zooming termination means 24.

In step S92, it is judged whether the switch 2CSW is ON or not; the process repeats step S92 if the switch is not turned ON, and the process goes to Return if the switch is turned ON.

Consequently, the mid-exposure zooming operation may be automatically carried out without relying on the skilled technique on the part of the user, and besides the zooming speed may be properly set from comparison results of the focal length with the shutter speed. Thus, flow of an image which is to be photographed in the mid-exposure zooming mode may be rendered smooth and free from inconsistent density.

Figure 19:
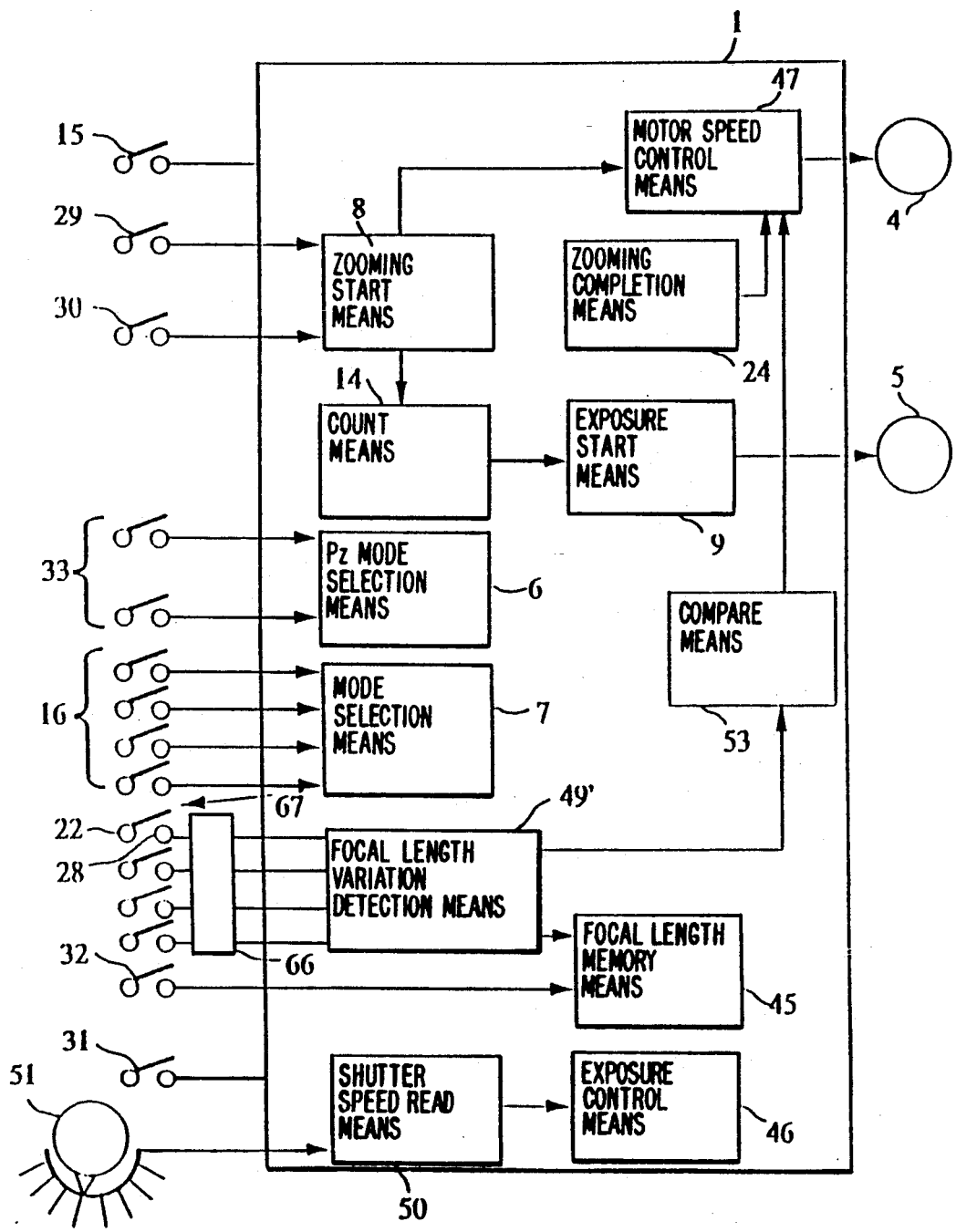
FIG. 19 is a block diagram showing a control circuit in a fifth embodiment of the invention.

In FIG. 19, the control circuit of the camera 10 having the mid-exposure zooming function will be described hereinbelow, with reference to the fifth embodiment of the invention. Explanation will be omitted for portions which are identical with those in the fourth embodiment.

The control section 1 further comprises comparison means 53. This comparison means 53 is adapted to compare a variation in the focal length as detected by the focal length variation detection means 49' with a focal length variation factor C which has been preset beforehand.

The focal length distance variation detection means 49' is adapted to detect a variation in the focal length at the time of zooming in response to codes which are read by the code brush 28 from the code plate 22. The motor speed control means 47 controls the rotation speed of the zooming motor 4 to make consistent a variation in the variation of the focal length at the time of the zooming operation.

Figure 20:
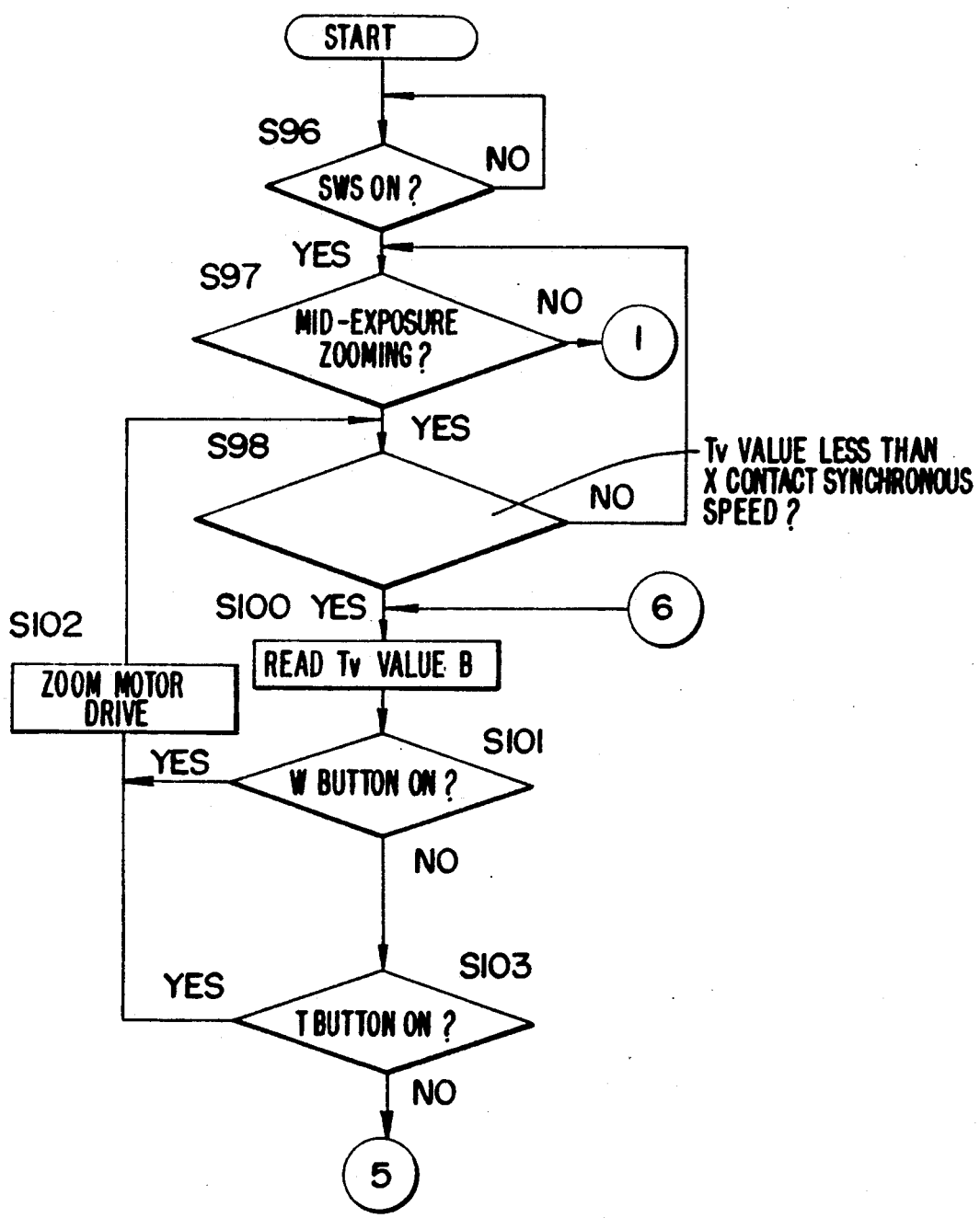
FIGS. 20-22 are flow charts showing how the fifth embodiment operates.
Figure 21:
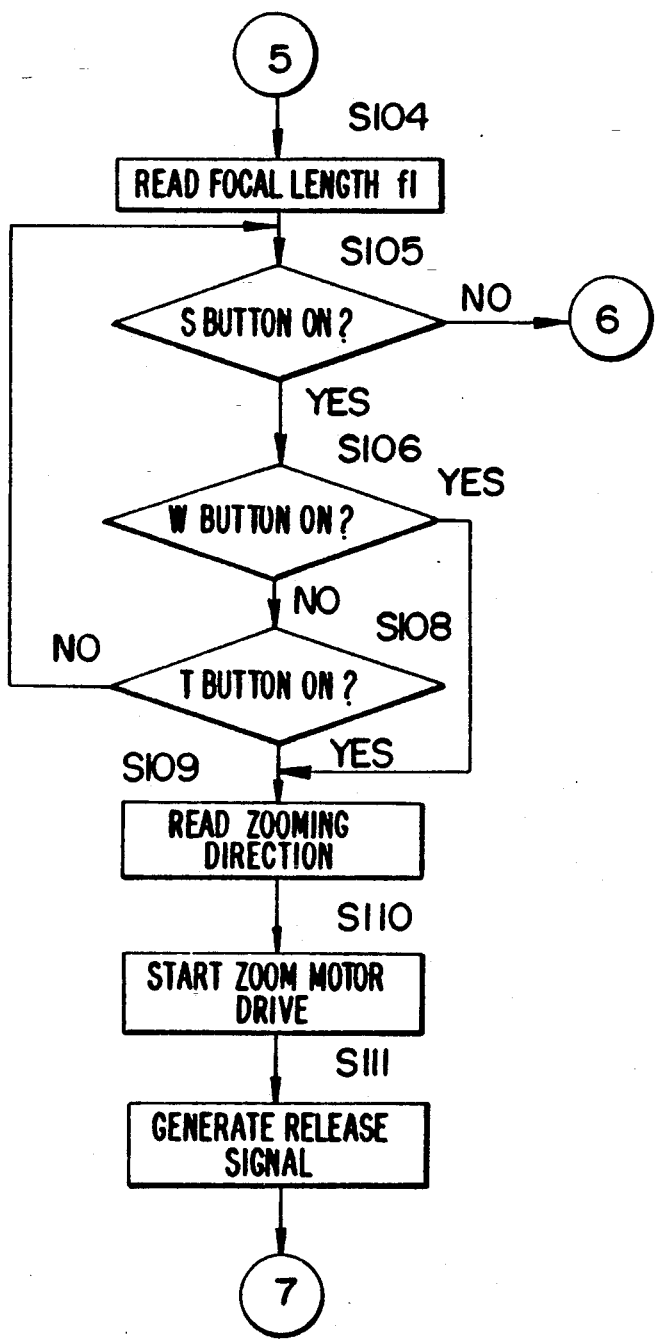
Figure 22:
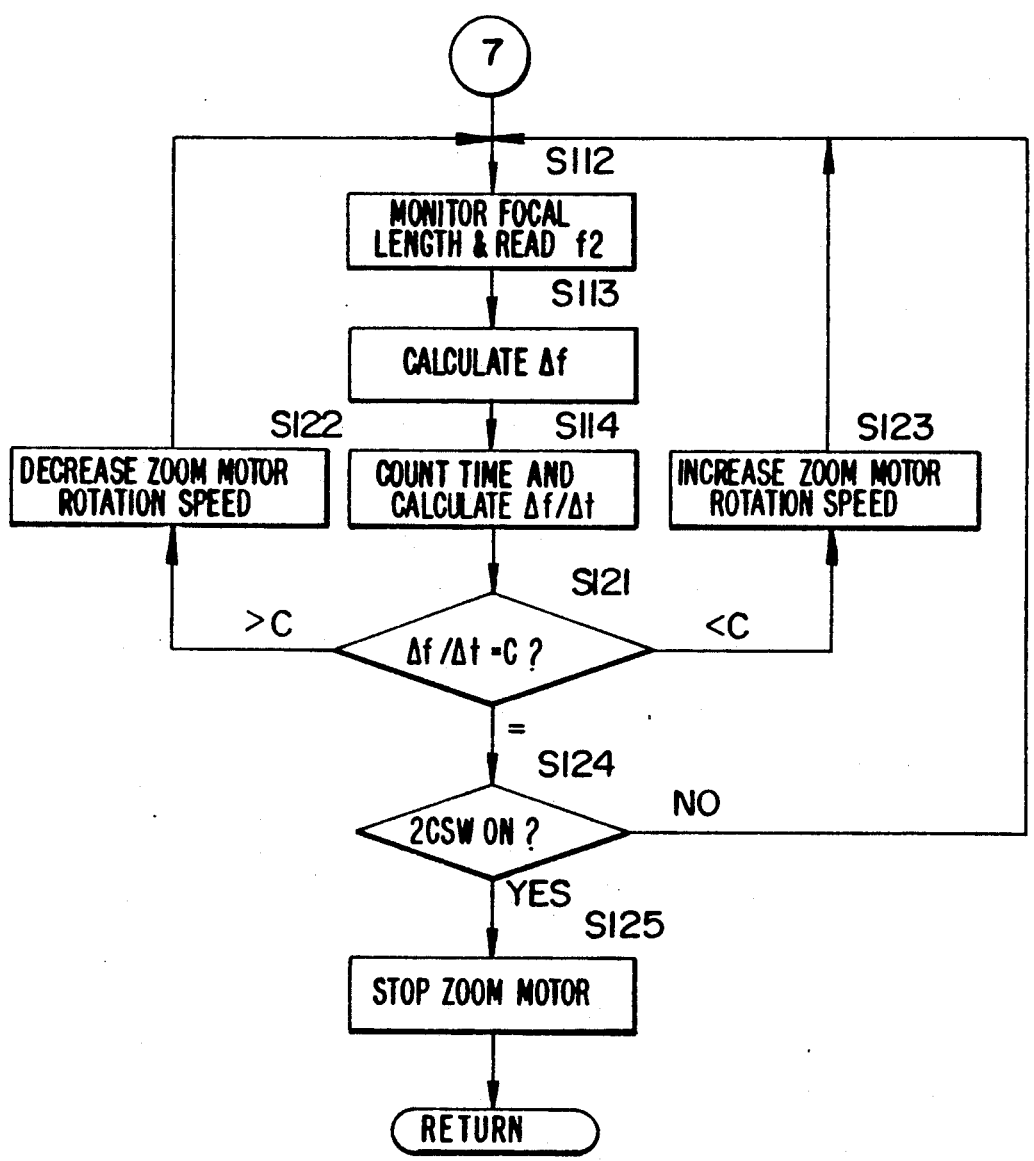

The operation of this embodiment will be described hereinbelow, with reference to FIGS. 20–22.

Figure 10:
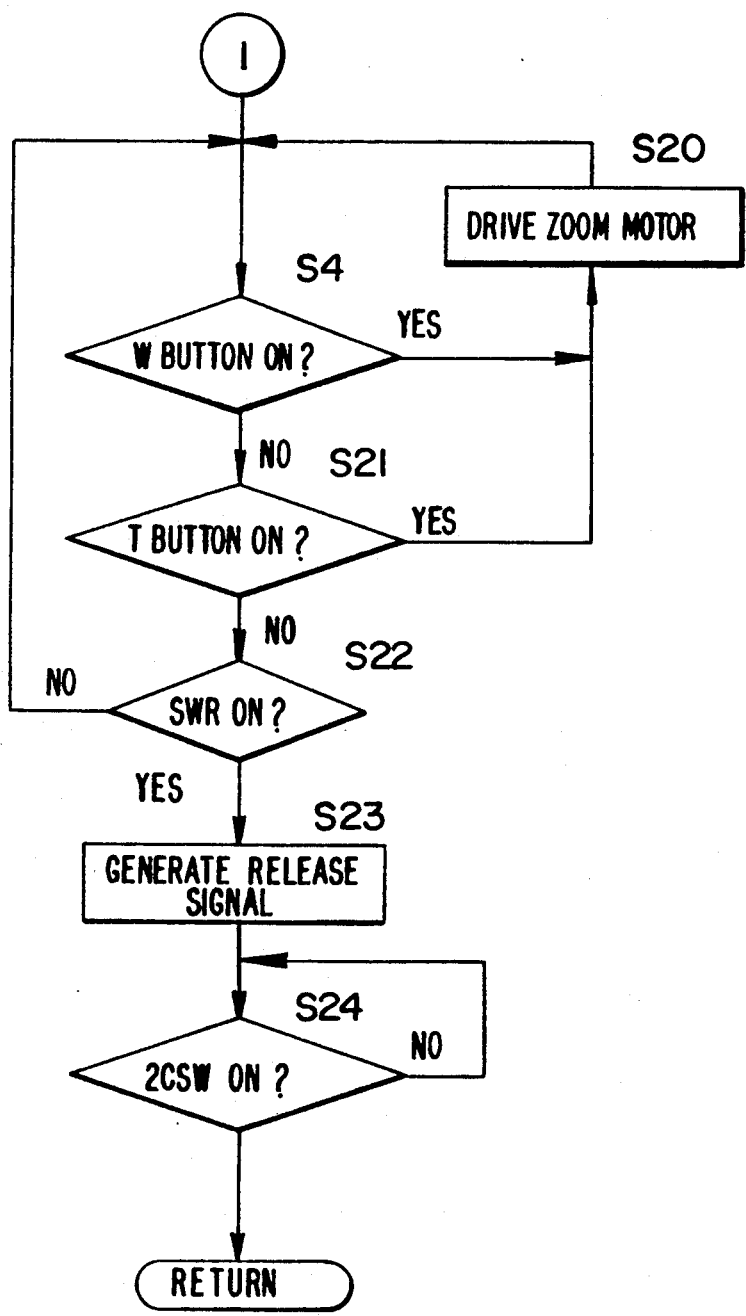

When the release switch 15 is depressed halfway to turn ON the light measuring switch SWS in step S96, it is judged whether the mid-exposure zooming operation is about to be taken or not in step S97. The process advances to step S98 if the mid-exposure zooming operation is about to be taken, and the process advances to step S4 if the mid-exposure zooming operation is not intended (FIG. 10). The process to be taken after this step S4 is the same as that shown in FIG. 10.

Next, the shutter dial 51 is operated to preset a proper shutter speed.

In step S98, it is judged whether the Tv value (shutter speed) is slower than the X contact synchronous speed (strobe synchronous speed).

As a result, the process is repeated in step S97 if the shutter speed is not slower than the X contact synchronous speed, and the process advances to step S100 if it is slower than the X contact synchronous speed.

In step S100, the Tv value B as preset by means of the shutter dial is recorded in the shutter speed read-in means 50 to advance the process to step S101.

In step S101, it is judged whether or not the wide-angle switch 29 is ON or not; the process advances to step S102 if the switch is turned ON to drive the zoom motor 4 to and is then passed to step S98. If the wide-angle switch 29 is not turned ON. the process advances to step S103.

In step S103, it is judged whether the telescoping switch 30 is turned ON, and the process advances to step S102 if the telescoping switch 30 is turned ON, and the process advances to step S104 it the switch is not turned ON.

In step S104, a focal length f1 for the termination of the zooming operation is read into the memory means 45 to advance the process to step S105.

In step S105, it is judged whether the start switch 31 is turned ON or not; the process returns to step S100 if the start switch 31 is not turned ON, and the process advances to step S106 if the switch is turned ON.

In step S106, it is judged whether the wide-angle switch 29 is ON or not; the process jumps to step S109 if the switch is turned ON, and the process advances to step S108 if the switch is not turned ON.

In step S108, it is judged whether the telescoping switch 30 is ON or not; the process returns to step S105 if the switch is not turned ON, and the process advances to step S109 if the switch is turned ON to perform the reading-in of the zooming direction.

In step S110, the zoom motor 4 is actuated by means of the zooming starting means 8, and the release switch is actuated by means of the exposure starting means 9 in step S111 to generate release signals for bringing the step further to process S112.

In step S112, a variation in the focal length as read in by the focal length variation detection means 49' is monitored to read in the focal length f2 for the starting of the zooming operation, and then the process is advanced to step S113.

In step S113, a variation $\Delta f$ in the focal length is calculated, and the process is advanced to step S114.

In step S114, the count means 14 is actuated to count down the time t, thereby calculating $\Delta f/\Delta t$ (variation in time).

In step S121, the comparison means 53 compares $\Delta f/\Delta t$ as calculated in the step S114 with a variation factor C in the focal length as preset beforehand.

As a result, the process advances to step S122 if $$\Delta f/\Delta t > C,$$

thereby reducing the rotation speed of the zoom motor 4 by means of the motor speed control means 47.

In turn, the process advances to step S123 if $$\Delta f/\Delta t < C,$$

thereby increasing the rotation speed of the zoom motor 4 by means of the motor speed control means 47.

When equality is reached, the process advances to step S124, wherein it is judged whether the switch 2CSW is ON or not. The process returns back to step S112 if the switch is not turned ON, and the process advances to step S125 to stop the motor 4 and goes to Return if the switch is turned ON.

Consequently, the embodiment permits the user to perform the mid-exposure zooming operation in a convenient manner, thereby allowing him or her to control the rotation speed of the zoom motor 4 appropriately in terms of a variation factor in the focal length as preset beforehand. This arrangement permits the user to keep a variation factor in the focal length constant at the time of zooming, thereby allowing the user to provide a picture having smooth flow image.

Figure 23:
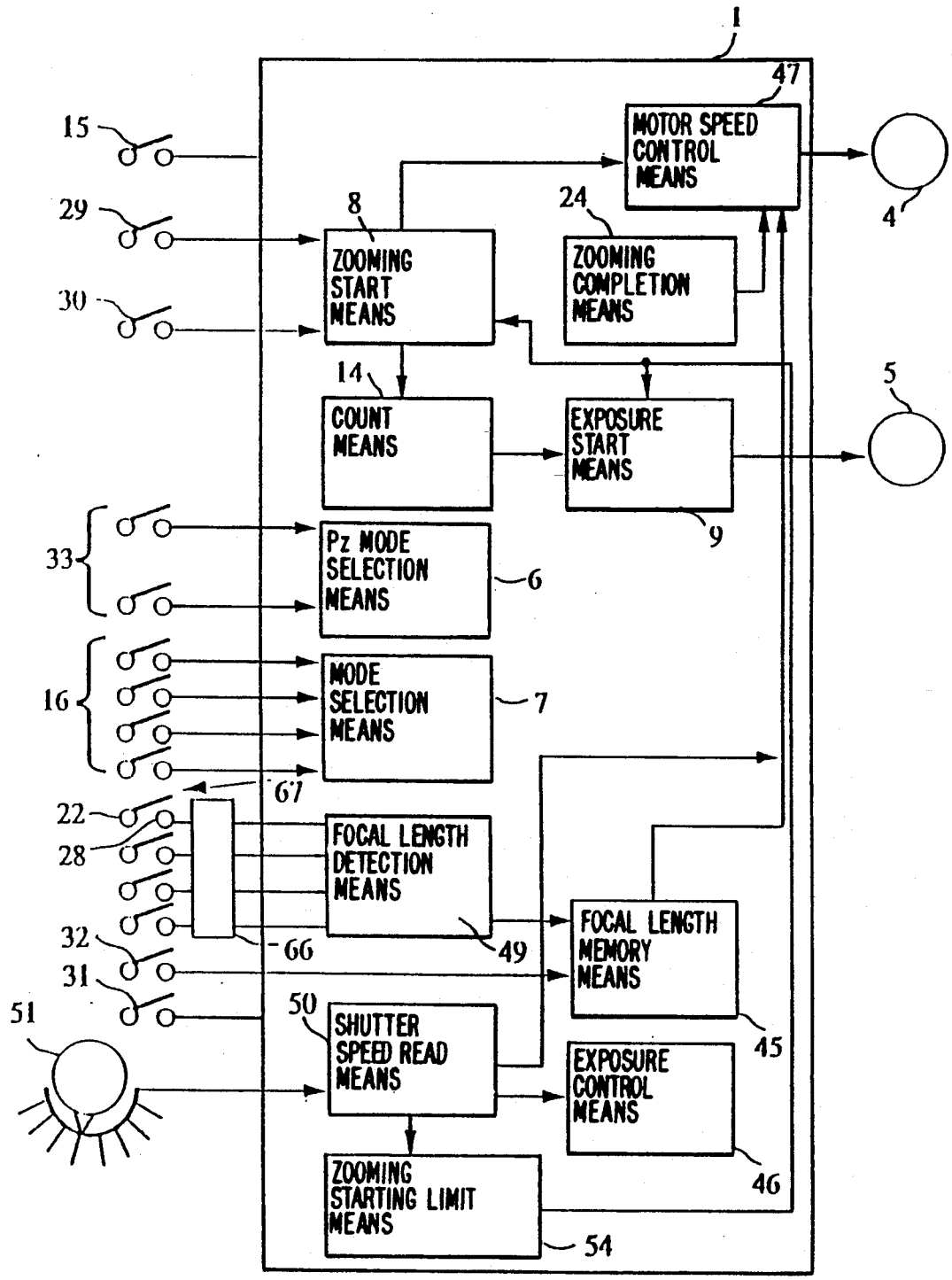
FIG. 23 is a block diagram showing a control circuit in a sixth embodiment of the invention.

The sixth embodiment of the control circuit for the camera 10 will be described hereinbelow, with reference to FIG. 23. The control section in this embodiment is different from the control section 1 in the fourth embodiment as shown in FIG. 15 in that zoom starting limit means 54 are provided. The zoom starting limit (i.e., restriction) means 54 serves to actuate the mid-exposure zooming only when the shutter speed is slower than the X contact synchronous speed as read in by the shutter speed read-in means 50.

The zoom termination (i.e., completion) means 24 and the motor speed control means 47 have the following functions. The zoom termination means 24 stops the driving of the zoom motor 4 by issuing a zoom termination signal. The motor speed control means 47 functions to stop the zooming operation when the power zoom lens 13 reaches a zoom-ending focal length f1 as stored in the focal length memory means 45 on an mid-exposure zooming, thereby terminating the zooming operation.

Figure 24:
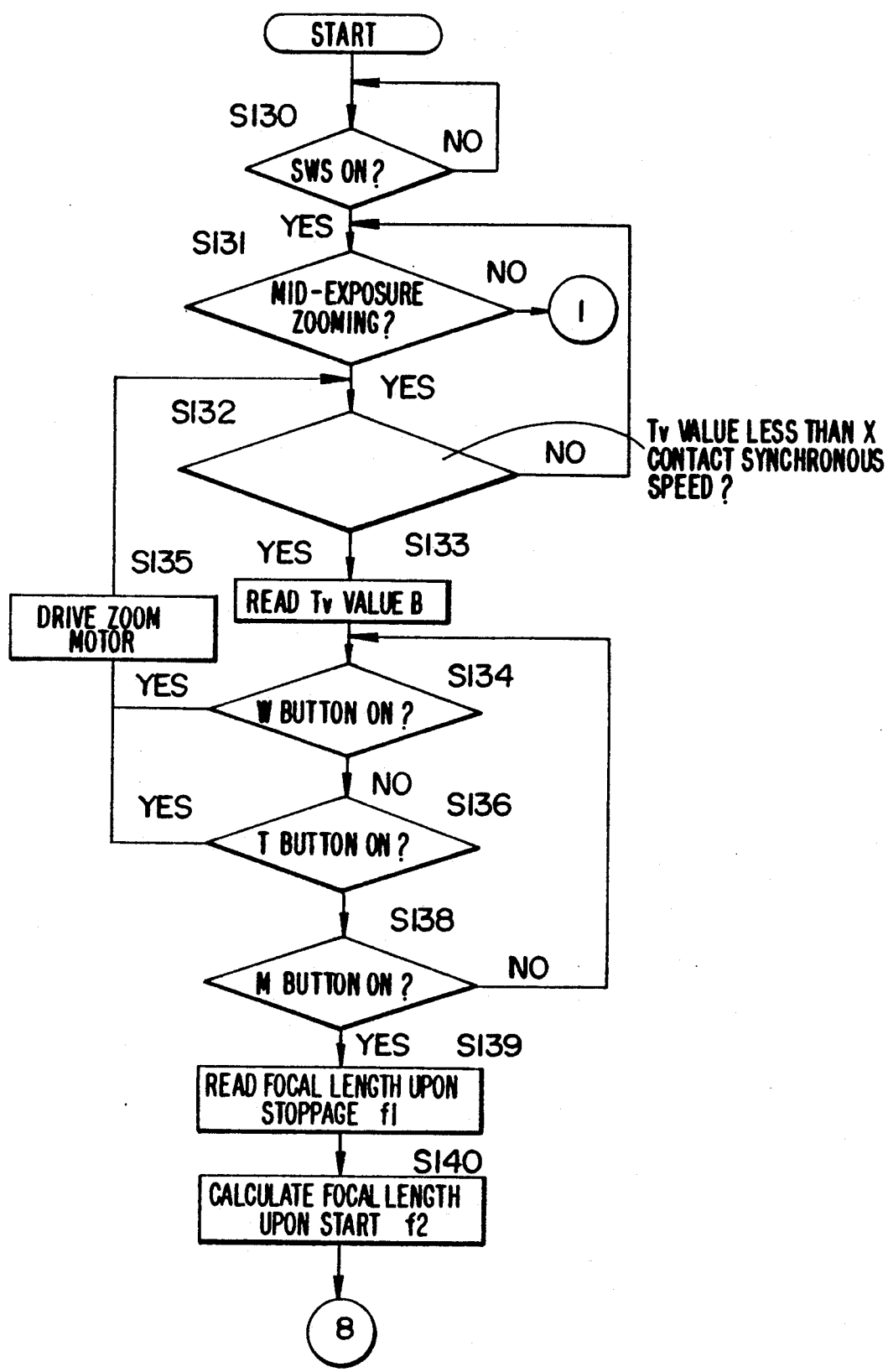
FIGS. 24-25 are flow charts showing how the sixth embodiment operates.
Figure 25:
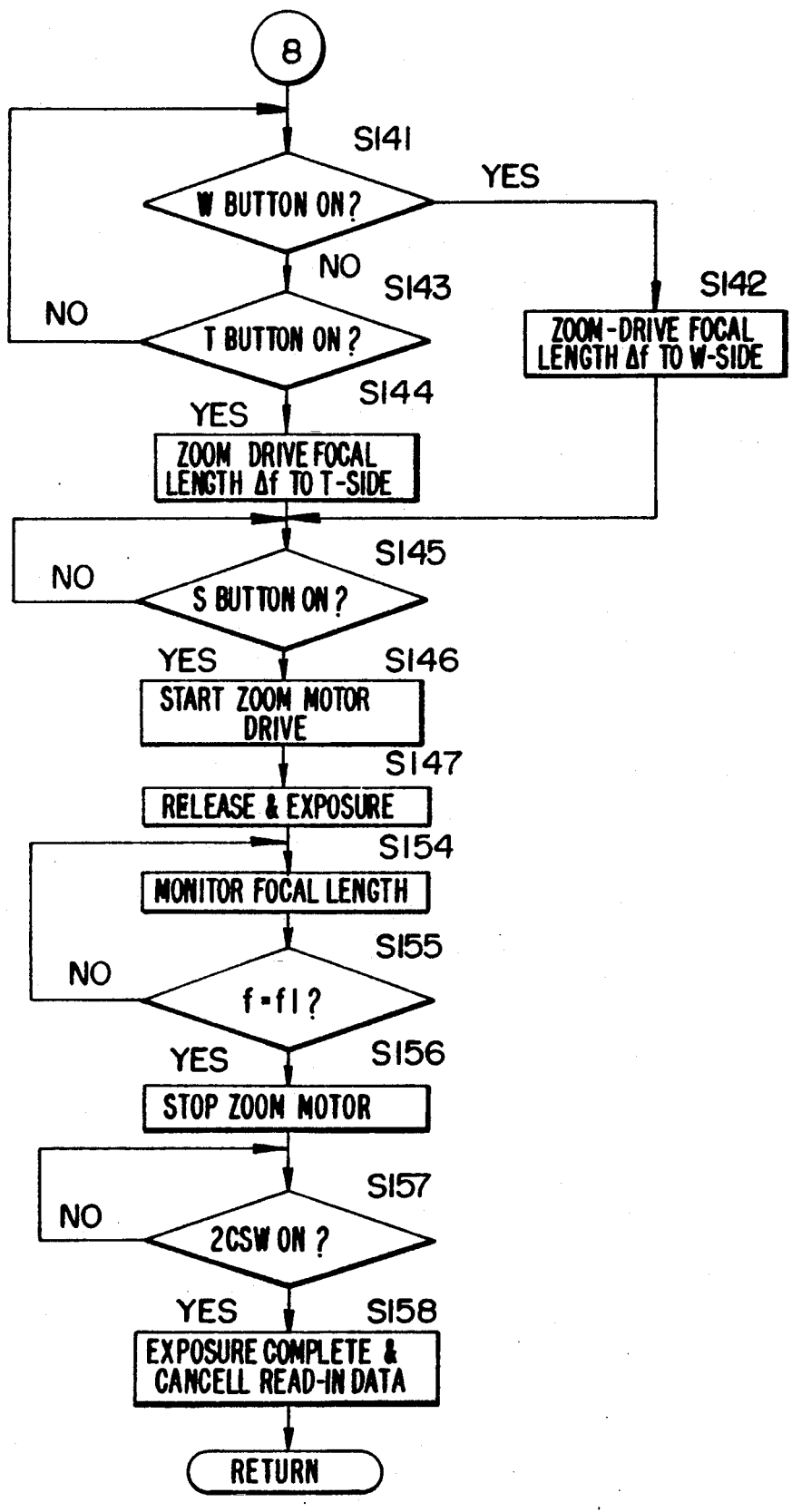

The operation of this embodiment will be described hereinbelow, with reference to FIGS. 24–25.

In step S130, when a user depresses the release switch halfway to turn ON the light measuring switch SWS, it allows the user to judge whether the mid-exposure zooming is about to be taken in step S131, If the mid-exposure zooming is intended, the process advances to step S132. The process is advanced to step S4 if the mid-exposure zooming is not intended (FIG. 10).

In step S132, the zooming starting limit means 54 serves to judge whether the Tv value as preset by means of the shutter dial 51 is slower than the X contact synchronous speed. As a result, when the shutter speed is faster than the X contact synchronous speed, the process returns back to step S131 and then is further advanced to step S4, whereas the process advances to step S133 if the shutter speed is slower than the X contact synchronous speed.

In step S133, the Tv value B as preset by means of the shutter dial 51 is read in by the shutter speed read-in means 50 to advance the process to step S134.

In step S134, it is judged whether the wide-angle switch 29 is ON or not. If the switch is turned ON, then the process advances to step S135 to drive the zoom motor 4 to by-pass the process to step S132. The process is then advanced to step S136 if the wide-angle switch 29 is not turned ON.

In step S136, it is judged whether or not the telescoping switch 30 is ON. As a result, the process advances to step S135, if the telescoping switch 30 is turned ON, and the process advances to step S138 if the telescoping switch 30 is turned OFF.

In step S138, it is judged whether the memory switch 32 is ON or not. The process is repeated from step S134 if the switch is not turned ON, and the process advances to step S139 if the switch is turned ON. BY releasing the memory switch 32 while the memory switch 32 is being depressed for the zooming operation, the focal length at that position is memorized, thereby allowing the user to read in the focal length f1 for the termination of the zooming (step S139).

In step S140, the operation of reading in the focal length f2 for the starting of the zooming is carried out.

In step S141, it is judged whether or not the wide-angle switch 29 is ON. The process advances to step S142 if the switch is turned ON, whereas the process is advanced to step S143 if the switch is not turned ON.

In step S142, the lens is zoomed toward a wide-angle position by the focal length of Δf, thereby advancing the process to step S145.

In step S143, it is judged whether the telescoping switch 30 is turned ON. The process advances to step S144 if the switch is turned ON, and the process returns back to step S141 if the switch is not turned ON.

In step S144, the lens is zoomed to move toward a telescoping position by the focal length of Δf, thereby advancing the process to step S145.

In step S145, it is judged whether or not the start switch 31 is ON. The process advances to step S146 if the switch is turned ON, and the process is repeated in step S145 if the switch is not turned ON.

Then, actuation of the zoom motor 4 is initiated (step S146) to cause the exposure starting means 9 to turn ON the release switch, thereby actuating the switch to generate the release signal for the starting of the exposure operation (step S147).

In step 154, the focal length as read in by the focal length detector means 49 is monitored to advance the process to step S155.

In step S155, it is judged whether $f = f1,$ that is, whether the focal length f has reached the focal length f1 for the termination of the zooming operation. If not equal, the process returns back to step S154, and the process is advanced to a step S156 if the result is equal.

In step S156, the motor speed control means 47 stops the operation of the zoom motor 4 to thereby advance the process to step S157.

In step S157, it is judged whether or not the switch 2CSW is ON. The process advances to step S158 if the switch is turned ON, and the process is repeated in step S157 if the switch is not turned ON.

In step S158, the exposure is completed and more data such as the focal length f1 for the zoom termination and the like are erased to let the process go to Return.

Thus, the embodiment allows the user to carry out the mid-exposure zooming operation automatically and conveniently without relying on the user's skilled-technique. Moreover, since the zoom motor 4 is rendered inoperative upon the motor speed control means 47 reaching the focal length f1 as stored for the zoom termination during the mid-exposure zooming, the user can stop the zooming operation at any given moment at a zooming termination focal length f1 which has been preset by looking at an object through the finder to verify the position. Consequently, it may be possible for the user to avoid the inconvenience of the zooming operation being only partially finished upon completion of the exposure operation, and thus the zoomed photographing effect may not be realized sufficiently despite the employment of the mid-exposure zooming operation. In this way, the user can imagine the finished photograph of an object before it is actually taken.

In the meantime, it may also be possible to design the embodiment such that the focal length f2 for the zoom starting may be varied in accordance with the Tv value. On presetting the focal length f1 for the zoom termination, it may also be possible to arrange the embodiment such that a warning signal can be emitted should the focal length f1 possibly not be realized within the total exposure time in accordance with the shutter speed as preset at that moment.

Next, the seventh embodiment of the present invention will be described hereinbelow. The control circuit in this embodiment is identical to that in the sixth embodiment of FIG. 26, except for the functions of the zoom termination means 24 and the motor speed control means 47.

That is, the zoom termination means 24 in this embodiment is adapted to stop the zoom motor 4 upon the count means 14 reaching a preset level relative to a shutter speed as read in by the shutter speed read-in means 50. The motor speed control means is adapted to control the zoom motor 4 such that a proper rotation speed of the zoom motor 4 can be calculated in accordance with the zoom termination focal length f1, the zoom starting focal length f2, each of which has been stored in the focal length memory means 45, and a shutter speed Tv which has been inputted into the shutter speed read-in means 50. In addition, the motor is controlled so as to rotate at the speed thus calculated.

Figure 26:
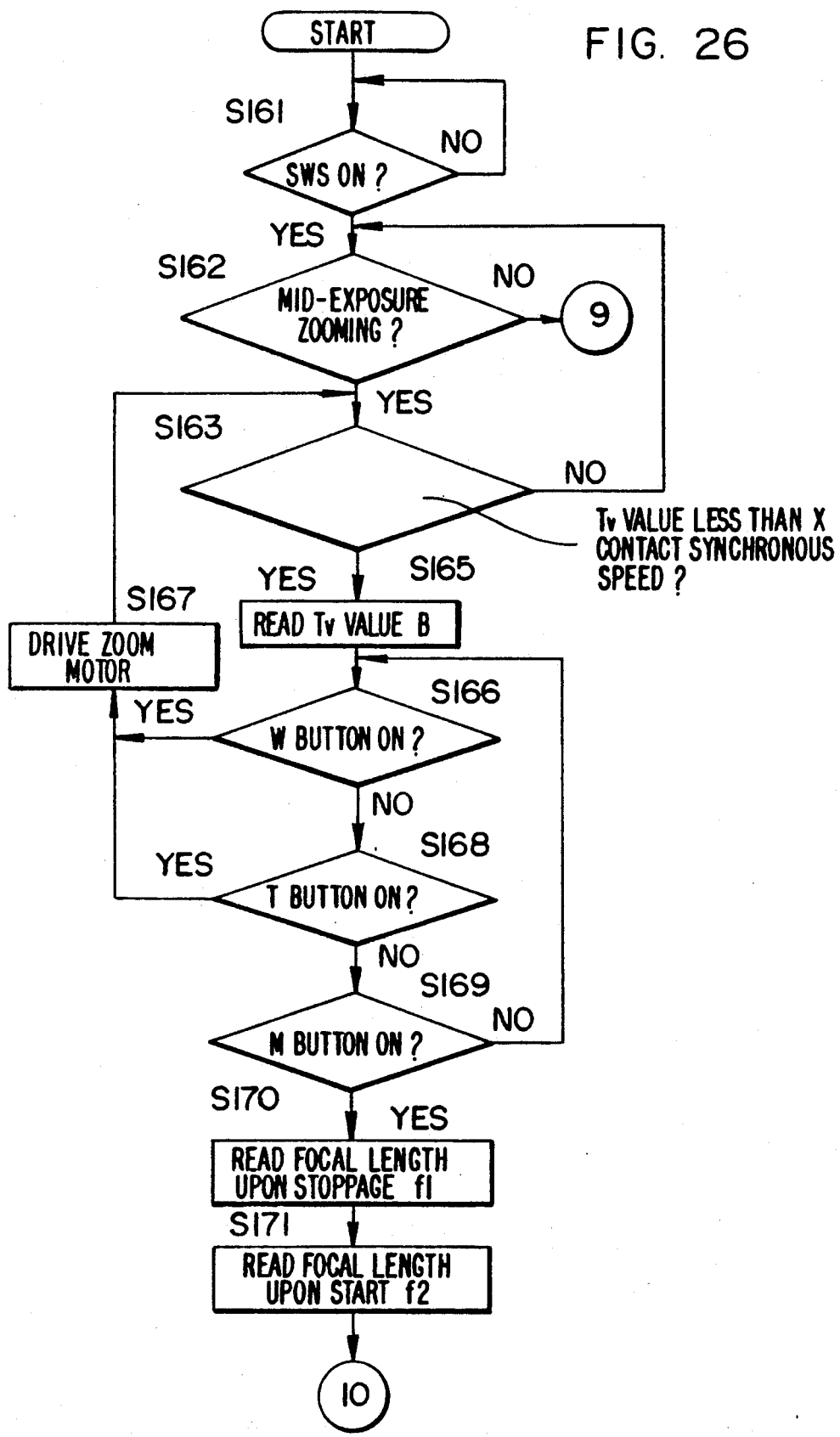
FIGS. 26-28 are flow charts showing how the seventh embodiment of the invention operates.
Figure 27:
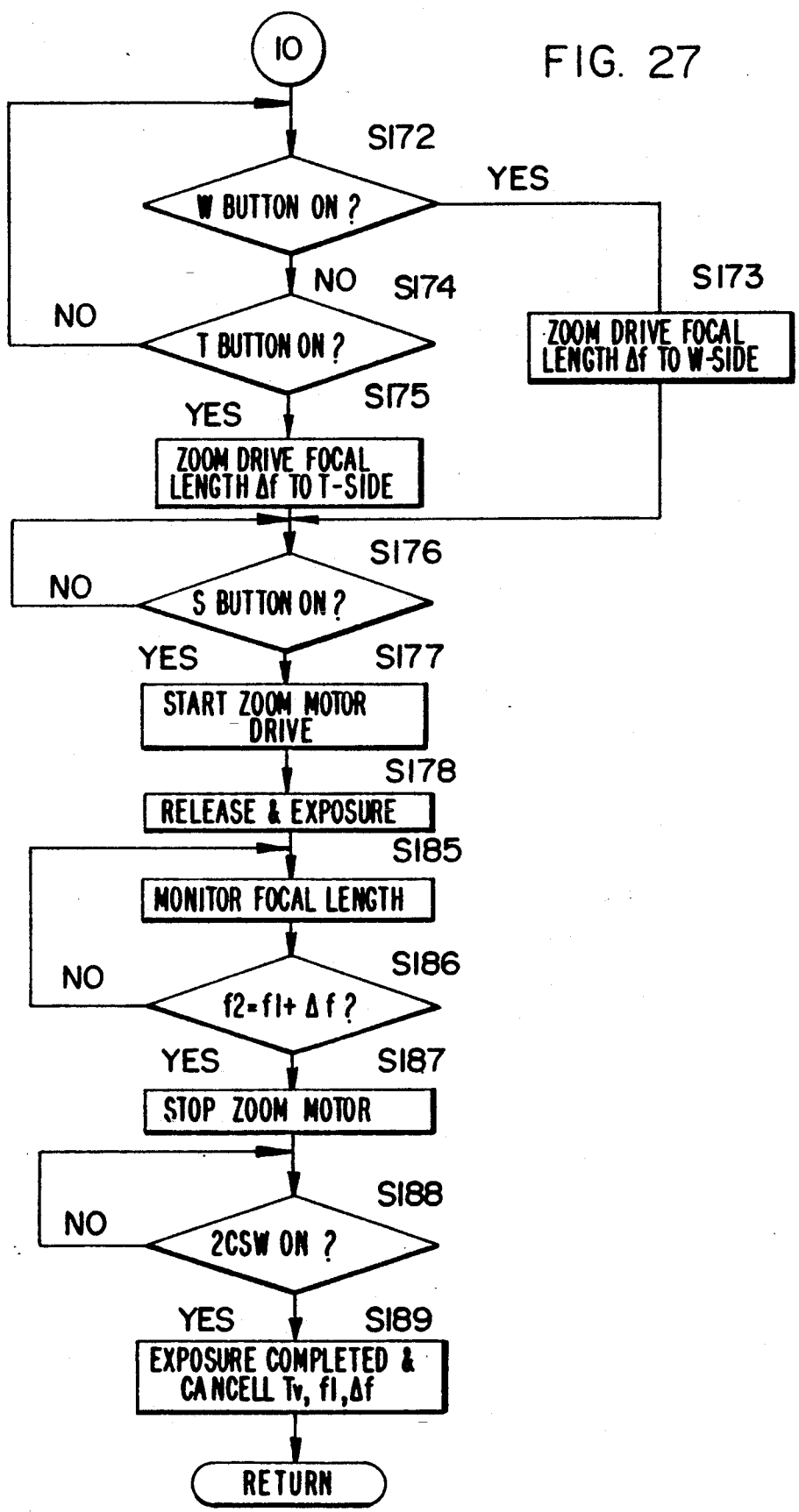
Figure 28:
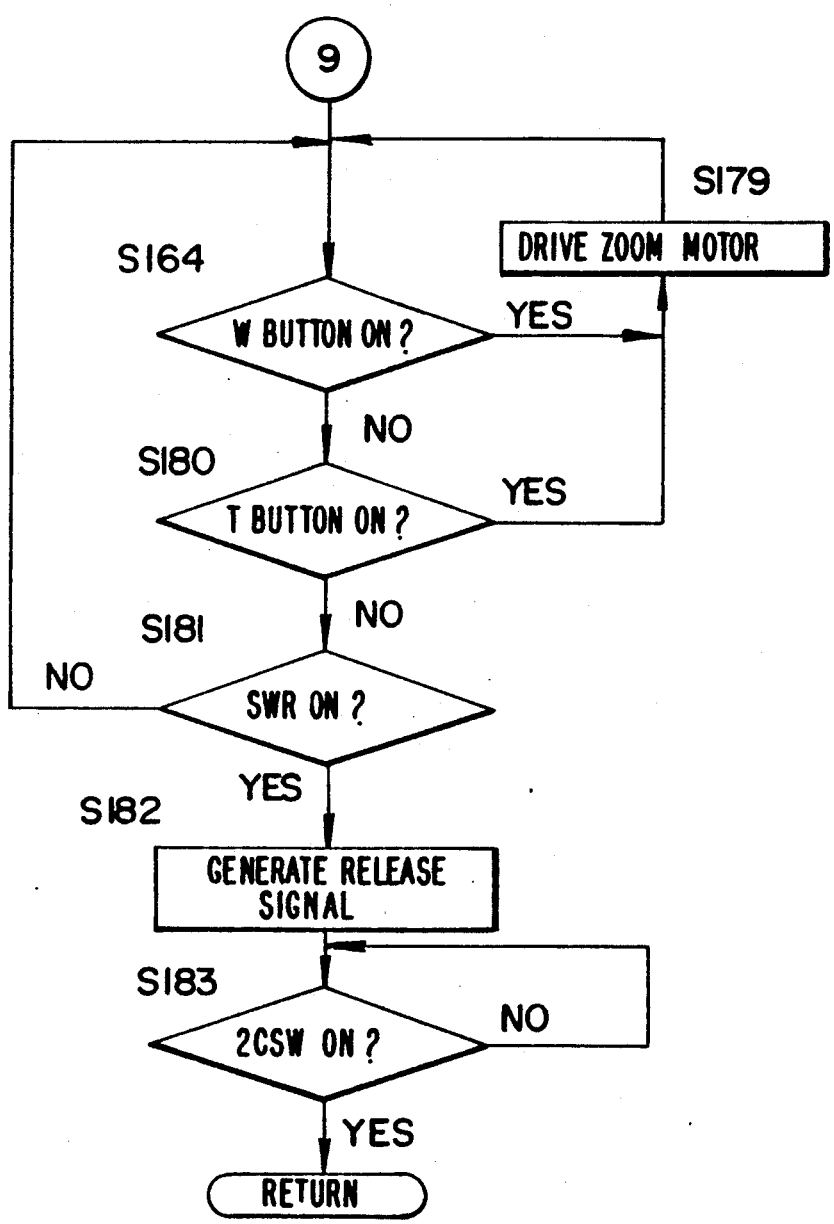

The operation of the camera in accordance with the seventh embodiment of the present invention is illustrated in FIGS. 26-28.

In step S161, the release switch 15 is halfway depressed to turn ON the light measuring switch SWS, thereby allowing the user to judge whether the mid-exposure zooming operation is about to be used. If the user intends to take the mid-exposure zooming operation, the process is advanced to step S163, and the process advances to step S164 if the mid-exposure zooming operation is not intended.

In step S164, it is judged whether or not the wide-angle switch 29 is ON. The process advances to step S179 if the switch is turned ON, thereby driving the zoom motor 4. The process advances to step S180 if the switch is not turned ON.

In step S180, it is judged whether the telescoping switch 30 is turned ON. If the switch is turned ON, the process advances to step S179 to drive the zoom motor 4, and the process is advanced to step S181 if the telescoping switch 30 is not turned ON.

In step S181, it is judged whether or not the shutter release switch 15 is ON, and the process is repeated if the switch is not turned ON. The process is advanced to step S182 if the switch is turned ON.

In step S182, a release signal is emitted by means of the exposure starting means 9 to advance the process to step S183.

In step S183, it is judged whether or not the switch 2CSW is ON, and the process is repeated if the switch is not turned ON. The process is advanced to step S184 for return if switch 2CSW is ON.

In step S163, a zooming starting limit means 54 acts to judge whether the Tv value as preset by the shutter dial 51 is slower than the X contact synchronous speed. As a result, the process returns to step S162 to further advance to step S164 if the shutter speed is slower than the X contact synchronous speed. Consequently, if a preset shutter speed is slower than the X contact synchronous speed, a simultaneous operation of will never occur the wide-angle switch 29 and the release switch 15, and between the telescoping switch 30 and the release switch 15. This serves to avoid a slit exposure in which a highlighted slit illuminated by the strobe light is formed on a picture and uneven density of images which would otherwise be caused due to the mid-exposure zooming operation.

In step S165, the Tv value B as preset by means of the shutter dial 51 is read in by the shutter speed read-in means 50 to advance he process to step S166.

In step S166, it is judged whether or not the wide-angle switch 29 is turned ON, and the process advances to step S167 if the switch is turned ON to drive the zoom motor 4 to skip to step S163. The process is advanced to step S168 if the wide-angle switch 29 is not turned ON.

In step S168, it is judged whether or not the telescoping switch 30 is turned ON, and the process is advanced to step S167 if the telescoping switch 30 is turned ON. The process is advanced to step 8169 if the telescoping switch 30 is not turned ON.

In step S169, it is judged whether or not the memory switch is turned ON. The process is repeated from step S166 if the switch is not turned ON, whereas the process is advanced to step S170 if the switch is turned ON. By releasing the memory switch 32 while the user depresses the memory switch 32 with the zooming mode, its focal length at that position can be stored.

This procedure may allow the user to read the zooming termination focal length f1 in the step S170.

In step S171, the focal length f2 for the zooming operation starting is read in.

In step S172, it is judged whether the wide-angle switch 29 is turned ON. The Process advances to step S173 if the switch is turned ON. If the switch is not turned ON, the process is advanced to step S174.

In step S173, the lens is driven to move toward the wide-angle position by the amount of a focal length equivalent with the magnitude of $\Delta f$, and the process then advances to step S176. This magnitude $\Delta f$ is obtained as described below.

Assuming that the focal length at the time of the EXZ (exposure zoom) termination is f1 [mm], the Tv value is B [sec], the rate at which the focal length is caused to vary is Vf, and a constant is set as K which is defined to stop the zooming operation when 80% of the total exposure time period is passed relative to the shutter speed, then it follows that:

$$\Delta f = Vf \times K \times B = 0.8 \ Vf \cdot B$$

In step S174, it is judged whether or not the telescoping switch 30 is turned ON. The process is advanced to step S175 if the switch is ON, and the process returns back to step S172 if the switch is not turned ON.

In step S175, the lens is zoom-driven toward the telescoping side by the amount of focal length equivalent to the magnitude of $\Delta f$.

In step S176, it is judged whether the start switch 31 is turned ON. The process is advanced to step S177 if the switch is turned ON, and the process repeats step S176 if the switch is not turned ON.

In step S177, the actuation of the zoom motor 4 is initiated.

In step S178, the exposure starting means 9 turns ON the release switch to emit release signals, thereby allowing the user to initiate the exposure operation.

In step S185, a focal length which has been read in by means of the focal length detector means 49 is monitored, and then the process is advanced to step S186.

In step S186, it is judged whether a relation such as $$f2 = f1 + \Delta f$$

is present. The process returns back to step S185 if the above equation is not present and is advanced to step S187 if the above equation is present.

In step S187, the drive of the zoom motor 4 is stopped to advance the process to step S188.

In step S188, it is judged whether or not the switch 2CSW is ON. The process advances to step S189 if the switch is turned ON, and the process is repeated if the switch is not turned ON.

In step S189, the exposure operation is completed, and moreover the Tv value and the focal length f1 and $\Delta f$ which have been input are erased to let the process go to Return.

In this embodiment, the mid-exposure zooming operation may be carried out automatically and conveniently without relying on the user's skilled-technique. Furthermore, since the zooming starting means 54 limit the operation of the mid-exposure zooming operation when the shutter speed is faster than a preset reference shutter speed (X contact synchronous speed), and it can reliably avoid the occurrence of the slit exposure and a problem that the mid-exposure zooming operation is carried out at the slit exposure, and thereby creating a picture where the density of the image is uneven.

Figure 33:
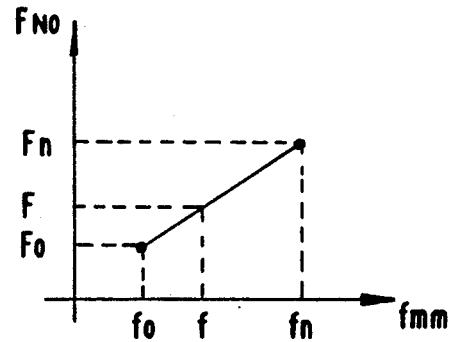
FIG. 33 is a graph showing the relationship between the focal length f and the open F value in a traditional zoom lens.

Next, the eighth embodiment of the invention will be described hereinbelow. The relationship between the focal length f and the F number of the diaphragm F is shown in FIG. 33. This relationship between the focal length f and the F number is kept in constant proportion. Thus, as the F number is varied in response to the focal length f, an exposure amount to be imposed on a film surface varies with the value F, thereby causing an uneven exposure. The embodiment permits the user to perform the mid-exposure zooming operation automatically and conveniently, to thereby further eliminating the occurrence of such an uneven exposure.

Figure 29:
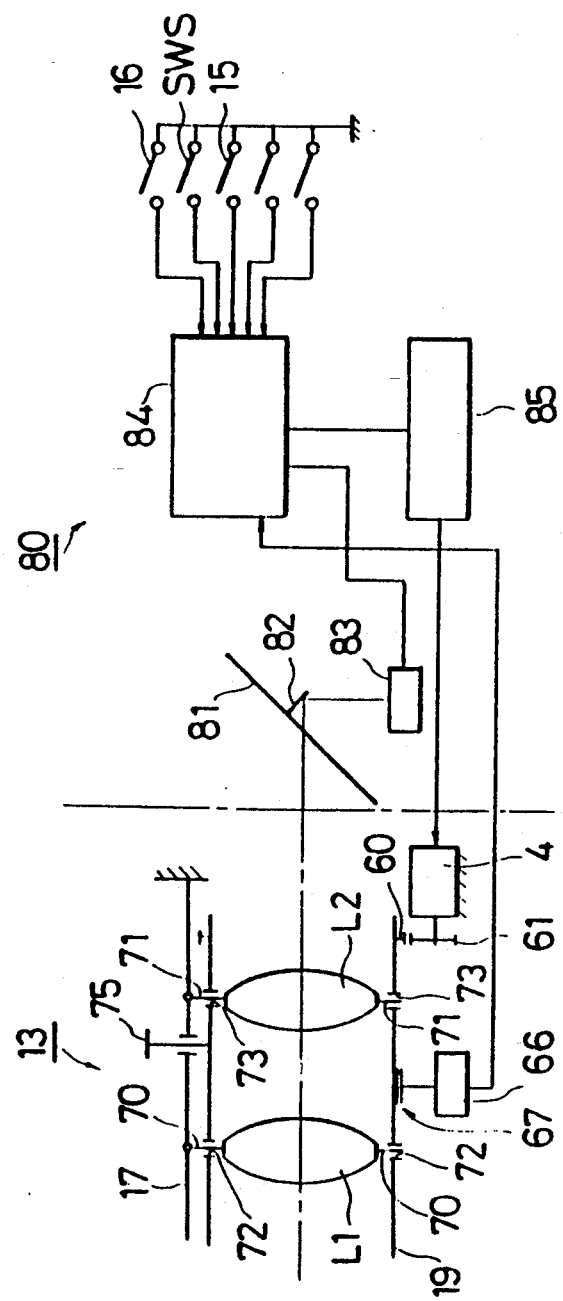
FIG. 29 is a view showing the outline of the power zoom lens and its control block in the eighth embodiment of the invention.

In FIG. 29, the arrangement of the power zoom lens is identical to that as shown in FIG. 4. The relationship between the F number and the focal length f for the power zoom lens is identical to that shown in FIG. 33 in the full zooming range.

Signals which are read in through a decoder 67 are output to a lens CPU66. The lens CPU66 determines the focal length f and its corresponding F number with, as its basis, the output from the decoder 67. Those data are output to the control section 84 of the camera body 80.

The control section 84 is usually composed of microcomputers to drive the zoom motor 4 for a zooming operation in accordance with the program which has been stored in the internal ROM.

Some of beam flux from the object to be photographed which has passed through lens groups L1 and L2 is transmitted through a half mirror section of the main-mirror 81 and reflected by the sub-mirror 82 for introduction into the CCD distance measuring sensor 83. This distance-measuring sensor 83 is of a phase-difference detection type, and it outputs to a control section 84 the phase information of images which have been halved. The control section 84 executes a predirector computation in accordance with phase difference information to obtain a magnitude for defocusing, thereby allowing the user to adjust the focus. Such a mechanical arrangement is known per se.

The camera body 80 is provided with the light measuring switch SWS, a mirror 81, the shutter release switch 15 for initiating the exposure operation by driving the shutter and the aperture (not shown), and the mode selection switch 16 for selecting the mid-exposure zooming mode, all of which components are connected with the inlet port of the control section 84.

The embodiment has the mode selection switch 16 which is used to select the mid-exposure zooming mode. While on the mid-exposure zooming mode, either the wide-angle switch 29 or the telescoping switch 30 is actuated to select either the telescoping zoom or the wide-angle zooming mode, respectively.

Alternatively, the wide-angle zooming may be taken when the power zoom lens 13 is in a telescoping position, and the telescoping zooming operation may be available when the power lens is in a wide-angle position, or the lens may be zoomed in a reverse direction when the focal length at the starting of the exposure operation is either in a wide-angle position or a telescoping position.

When the power zoom lens 13 is zoomed from the focal length fo to the focal length fn, the F number F is made to vary from the value Fo to the value Fn as shown in FIG. 33. In the eighth embodiment, the zooming speed is increased to the wide-angle position where the F number is small (diaphragm aperture is large), and the zooming speed is reduced to the telescopic side where the F number F is large (diaphragm aperture is small). This variation in speed serves to keep constant the intensity of the incident beam, i.e., the exposure amount on the film surface in the entire zooming ranges.

This variation in the zooming speed may be achieved by varying the rotation speed of the zoom motor 4, or by varying the profile of the cam grooves 72, 73 in the cam ring 19 while keeping a constant rotation speed of the zoom motor 4.

Adjustment of the motor speed may be achieved by varying the pulse frequency in a case where the zoom motor 4 is constituted by a pulse motor, or by varying a voltage in a case where the zoom motor 4 is formed from a DC brush motor. In either case, the rotation speed for each of the focal lengths f may be determined from the equation $$R = g(F)Ro$$

where, Ro is a rotation speed at the wide-angle position and $g(F) = \frac{1}{2}^{logF-logFo)/log2}$.

Figure 30:
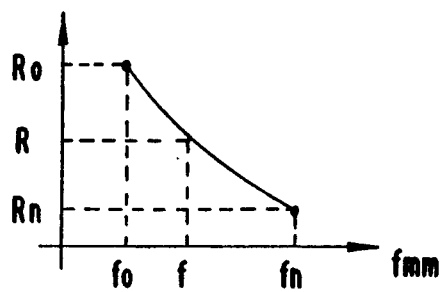
FIG. 30 is a graph showing the relationship between the rotating speed R of the zoom motor and the focal length F.

This relationship is shown in the graph in FIG. 30.

In order to keep the rotation speed of the zoom motor 4 at a constant, the zooming speed can be made variable by varying the profiles of the cam grooves 72 and 73. In this case, the focal length graduation range can be expressed by the equations of:
ti H = h(f) Ho, where Ho is a graduation range around the wide-angle position, and $$h(f) = 2^{(logF-logFo)/log2}.$$

Figure 31:
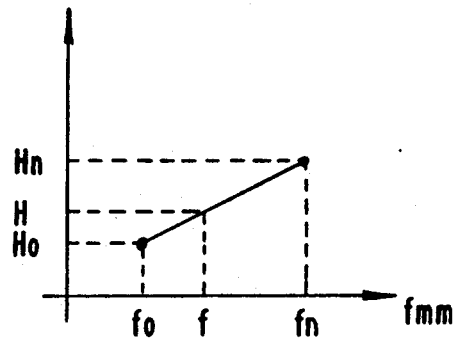
FIG. 31 is a graph showing the relationship between the focal length scale width and a focal length in the eighth embodiment.

This relationship is shown in the graph of FIG. 31.

Figure 32:
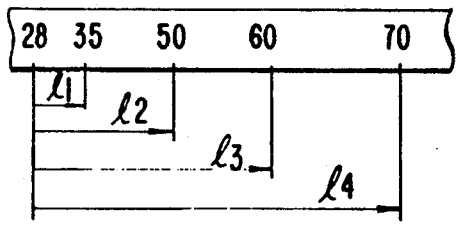
FIG. 32 is a focal length scale which corresponds with that in the FIG. 31 graph.

One example of this distance graduation given this condition is indicated in FIG. 32 The distance graduation ranges l1–l4 as shown in FIG. 32 may be obtained from the following equation $$l = \int_{fo}^{f} h(f) df$$

Figure 34:
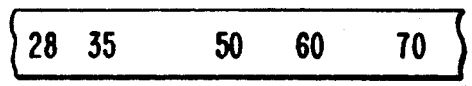
FIG. 34 is a view showing a focal length scale with the magnitude of variation of the focal length relative to the rotation angle of the zoom operating ring.

FIG. 34 shows a distance graduation where a focal length is maintained at a constant level relative to the rotation angle of the zoom operating ring 13.

Consequently, the embodiment permits the user to carry out the mid-exposure zooming operation automatically and conveniently without relying on his or her skilled-technique, and the user can avoid the uneven exposure result by exposing an image which is variable with the zooming operation at a constant intensity despite the full-open F number or preset F number being variable due to the zooming operation. Furthermore, the zooming speed is variable in a power zoom lens in accordance with the change of the F number, thereby permitting the user to expose the image with a constant intensity of light irrespectively of the focal length, and thus to photograph an image having a flow which is free from any uneven density under any condition.

We claim:

1. A camera having a mid-exposure zooming function comprising:
    a zoom motor for driving a zoom lens;
    a trigger switch for starting mid-exposure zooming; and
    mid-exposure zooming execution means for starting the driving of said zoom motor, from any of a plurality of positions within a zooming range, based on an operation of said trigger switch for starting exposure of a single image area.

2. A camera according to claims 1, wherein said mid-exposure zooming execution means comprises zooming starting means for starting the driving of zoom motor based on the operation of said trigger switch, exposure starting means for starting exposure based on an actuation of said zooming starting means, and detection means for detecting sufficient conditions for starting exposure.

3. The camera according to claim 2, wherein said detection means includes a counting means for counting time, wherein said counting means is initiated synchronously with the start of a zooming operation and counts time until sufficient conditions for starting exposure have been detected.

4. The camera according to claim 2, wherein said detecting means includes focal length monitoring means which is initiated synchronously with the start of the zooming operation, for monitoring a change in focal length until a certain magnitude of focal length variation is reached, thereby detecting sufficient conditions for starting exposure.

5. The camera according to claim 2, wherein said camera further comprises a start switch by which said zooming starting means is operated.

6. The camera according to claim 3, wherein said time counted by the mid-exposure zooming function is a period during which a zooming speed becomes constant.

7. The camera according to claim 3, wherein said time counted is set at 1/10th of a whole exposure time.

8. The camera according to claim 1, wherein said mid-exposure zooming execution means comprises zooming starting means for starting the driving of said zoom motor based on an operation of said trigger switch, exposure starting means for starting exposure based on an actuation of said zooming starting means, counting means for counting exposure time synchronously with the actuation of said zooming starting means, shutter speed read-in means for reading in a preset shutter speed, and zooming termination means for stopping the driving of said zoom motor when a value counted by said counting means reaching a predetermined portion of a whole exposure time corresponding to the shutter speed read-in by said shutter speed read-in means.

9. The camera according to claim 8, wherein said shutter speed read-in means further comprises a shutter dial to set a shutter speed which is to be read in said shutter speed read-in means.

10. The camera according to claim 8, wherein said predetermined portion of the whole exposure time is 80% of the whole exposure time.

11. The camera according to claim 1, wherein said mid-exposure zooming execution means comprises zooming starting means for starting the driving of said zoom motor based on an operation of said trigger switch, exposure starting means for starting exposure based on an actuation of said zooming means, focal length detection means for detecting a focal length of said zoom lens, focal length memory means for memorizing a zoom start focal length and a zoom completion focal length, shutter speed read-in means for reading in a preset shutter speed, and motor speed controlling means for controlling a driving speed of said zoom motor based on focal length data memorized by said focal length memory means and shutter speed data memorized by said shutter speed read-in means.

12. The camera according to claim 11, wherein said camera further comprises a memory switch, and said focal length memory means operates based on the operation of said memory switch.

13. The camera according to claim 11, wherein said shutter speed read-in means further comprises a shutter dial to set a shutter speed which is to be read in said shutter speed read-in means.

14. The camera according to claim 1, wherein said mid-exposure zooming execution means comprises zooming starting means for starting the driving of said zoom motor based on an operation of said trigger switch, exposure starting means for starting exposure based on an actuation of said zooming starting means, focal length variation detection means for detecting the amount of variation of focal length undergone by said zoom lens, comparison means for comparing variation of focal length detected by said focal length variation detection means with a predetermined variation rate of focal length, and motor speed controlling means for controlling a rotation speed of said zoom motor based on a result of the comparison performed by said comparison means so as to maintain the variation rate of focal length upon zooming at a constant value.

15. The camera according to claim 14, wherein said motor speed controlling means increases rotation of said zoom motor when the focal length variation detected by said focal length variation detection means is larger than the predetermined variation rate of focal length, and said motor speed control means decrease rotation of said zoom motor when the focal length variation detected by said focal length variation detection means is smaller than the predetermined variation rate for focal length.

16. The camera according to claim 1, wherein said mid-exposure zooming starting means comprises zooming starting means for starting the driving of said zoom motor based on an operation of said trigger switch, exposure starting means for starting exposure based on an actuation of said zooming starting means, memory means for memorizing a zoom completion focal length, and motor controlling means for stopping said zoom motor when the focal length reaches said zoom completion focal length as memorized in said focal length memory means during mid-exposure zooming.

17. The camera according to claim 16, wherein said zoom lens includes a memory switch, and said focal length memory means for memorizing the zoom completion focal length operates based on the operation of said memory switch.

18. The camera according to claim 1, wherein said mid-exposure zooming execution means comprises zooming starting means for starting the driving of said zoom motor based on an operation of said trigger switch, exposure starting means for starting exposure based on an actuation of said zooming starting means, shutter speed read-in means for reading-in a preset shutter speed, and zooming starting limiting means for allowing operation of said mid-exposure zooming execution means only when the shutter speed read in said shutter speed read-in means is slower than a predetermined standard shutter speed.

19. The camera according to claim 18, wherein said predetermined standard shutter speed is a contact synchronous speed.

20. The camera according to claim 1, further comprising a mid-exposure zooming mode for execution of zooming during exposure, and control means for varying a zooming speed during exposure in accordance with a variation of the diaphragm performed by zooming.

21. The camera according to claim 20, wherein the zooming speed is set such that it becomes faster when the diaphragm aperture is large, and slower when the diaphragm aperture is small.

22. A camera having a mid-exposure zooming function comprising:
- a zoom motor for driving a zoom lens;
- a trigger switch for starting mid-exposure zooming;
- zooming starting means for starting the driving of said zoom motor based on an operation of said trigger switch;
- exposure starting means for starting exposure based on the actuation of said zooming starting means; and
- counting means for counting time synchronously with the operation of said zooming starting means, said exposure starting means starting exposure when the counting means counts a predetermined time.

23. The camera according to claim 22, wherein said predetermined time is a time period at which a zooming speed of said zoom lens becomes constant.

24. The camera according to claim 22, wherein said predetermined time is set at 1/10 of the whole exposure time.

25. The camera according to claim 22, wherein said camera further comprises a start button by which said zooming starting means is operated.

26. A camera having a mid-exposure zooming function comprising:
- a zoom motor for driving a zoom lens;
- a shutter speed read-in means for reading-in a preset shutter speed;
- mid-exposure zooming execution means for driving said zoom motor, and for starting exposure;
- counting means for counting an exposure time synchronously with an actuation of said mid-exposure zooming exposure actuation means; and
- zooming termination means for stopping the driving of said zoom motor when a value counted by said counting means reaches a predetermined portion of a whole exposure time corresponding to the shutter speed read-in by said shutter read-in means.

27. The camera according to claim 26, wherein said shutter speed read-in means further comprises a shutter dial to set a shutter speed which is to be read in said shutter speed read-in means.

28. The camera according to claim 26, wherein said predetermined portion of the whole exposure time is 80% of the whole exposure time.

29. A camera having a mid-exposure zooming function comprising:
- a zoom motor for driving a zoom lens;
- focal length detection means for detecting a focal length of said zoom lens;
- mid-exposure zooming execution means for driving said zoom motor, and starting exposure;
- focal length memory means for memorizing a zoom start focal length and a zoom completion focal length;
- shutter speed read-in means for reading in a preset shutter speed; and
- motor speed controlling means for controlling the driving speed of said zoom motor based on focal length data from said focal length memory means and shutter speed data from said shutter speed read-in means.

30. The camera according to claim 29, wherein said zoom lens includes a memory switch, and said focal length memory means operate based on an operation of the memory switch.

31. The camera according to claim 29, wherein said shutter speed read-in means further comprises a shutter dial to set the shutter speed which is to be read in said shutter speed read-in means.

32. A camera having a mid-exposure zooming function comprising:
- a zoom motor for driving a zoom lens;
- mid-exposure zooming execution means for driving said zoom motor, and for initiating exposure;
- focal length variation means for detecting an amount of variation of focal length performed by said zoom lens;
- comparison means for comparing the focal length variation detected by said focal length variation means with a predetermined variation rate of focal length; and
- motor speed control means for controlling a rotation speed of said zoom motor based on a result of a comparison performed by said comparison means so as to maintain a variation rate of focal length upon zooming at a constant value.

33. The camera according to claim 32, wherein said motor speed control means increases rotation of said zoom motor when the focal length variation detected by said focal length variation detection means is larger than the predetermined variation rate of focal length, and said motor speed control means decreases rotation of said zoom motor when the focal length variation detected by said focal length variation detection means is smaller than the predetermined variation rate of focal length.

34. A camera having a mid-exposure zooming function comprising:
- a zoom motor for zooming a zoom lens;
- mid-exposure zooming execution means for driving said zoom motor, and for starting exposure;
- memory means for memorizing a zoom completion focal length; and
- motor controlling means for stopping said zoom motor when a focal length reaches said zoom completion focal length as memorized in said focal length memory means during mid-exposure zooming.

35. The camera according to claim 34, wherein said zoom lens includes a memory switch, and said focal length memory means for memorizing the zoom completion focal length operates based on the operation of said memory switch.

36. A camera having a mid-exposure zooming function comprising:
- a zoom motor for driving a zoom lens;
- shutter speed read-in means for reading in a preset shutter speed;
- mid-exposure zooming execution means for driving said zoom motor, and for starting exposure; and
- zooming starting limiting means for allowing operation of said mid-exposure zooming execution means only when the shutter speed is slower than a predetermined standard shutter speed.

37. The camera according to claim 36, wherein said predetermined standard shutter speed is a contact synchronous speed.

38. A camera including a mid-exposure zooming function, said camera having a powered zoom function, comprising:

a mid-exposure mode for zooming during an exposure operation; and controlling means for varying a zooming speed during exposure in accordance with a variation of the diaphragm effected by zooming.

39. The camera according to claim 38, wherein the zooming speed is set such that it becomes faster when the diaphragm aperture is large, and slower when the diaphragm aperture is small.

40. The camera according to claim 1, said mid-exposure zooming execution means comprising means for driving said zoom motor in either a telephoto direction or a wide angle direction based upon an operation of said trigger switch for starting exposure.

41. A camera having a combined exposure-zooming function comprising:

a zoom motor for driving a zoom lens in first and second opposed directions within a zooming range defined between opposite telephoto and wide angle extremities;

means for actuating a shutter mechanism for starting a single image area exposure operation;

a trigger switch for starting a combined exposure-zooming operation; and combined exposure zooming operation execution means for starting the driving of said zoom lens selectively in either of said first and second opposed directions from any of a plurality of positions within said zooming range in coordination with the starting of a single image area exposure operation, in response to the operation of said trigger switch, wherein at least a portion of each of the zoom motor driving and the exposure operation occur simultaneously.

42. The camera according to claim 41, said combined exposure-zooming operation execution means comprising means for delaying one of the driving of the zoom lens and the starting of the exposure operation.

43. The camera according to claim 41, said combined exposure-zooming operation execution means further comprising means for detecting a predetermined condition and for starting one of the driving of said zoom lens and the actuation of an exposure operation in response to the detection of the predetermined condition.

44. The camera according to claim 43, wherein said detection means detects a predetermined portion of an exposure time.

45. The camera according to claim 43, wherein said detection means detects a focal length.

46. The camera according to claim 43, wherein said detection means detects a driving speed of said zoom motor.

* * * * *

UNITED STATES PATENT AND TRADEMARK OFFICE
CERTIFICATE OF CORRECTION

PATENT NO. : 5,134,432
DATED : July 28, 1992
INVENTOR(S) : S. Kohmoto et al

It is certified that error appears in the above-indentified patent and that said Letters Patent is hereby corrected as shown below:

On the cover page, in the section entitled [30] Foreign Application Priority Data, line 8, change "Feb. 24, 1990" to ---Feb. 14, 1990---.

At column 18, line 64 (claim 2, line 1), change "claims" to ---claim---.

At column 20, line 59 (claim 19, line 2), change "a" to ---an X---.

At column 21, line 36 (claim 26, line 10), change "actuation" to ---execution---.

At column 21, line 40 (claim 26, line 15), insert ---speed--- after "shutter".

At column 21, line 55 (claim 29, line 7), insert ---for--- after "and".

At column 22, line 62 (claim 36, line 11), delete "standard" after "predetermined".

Signed and Sealed this

Fifteenth Day of November, 1994

Attest:

BRUCE LEHMAN

Attesting Officer

Commissioner of Patents and Trademarks